(12) United States Patent
Nemoto et al.

(10) Patent No.: US 10,839,773 B2
(45) Date of Patent: Nov. 17, 2020

(54) TERMINAL DEVICE AND NON-TRANSITORY COMPUTER-READABLE MEDIUM

(71) Applicant: FUJI XEROX CO., LTD., Tokyo (JP)

(72) Inventors: Yoshihiko Nemoto, Kanagawa (JP); Tsutomu Kimura, Kanagawa (JP); Masahiro Sato, Kanagawa (JP); Akihito Yamauchi, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 6 days.

(21) Appl. No.: 15/493,754

(22) Filed: Apr. 21, 2017

(65) Prior Publication Data

US 2018/0144721 A1 May 24, 2018

(30) Foreign Application Priority Data

Nov. 22, 2016 (JP) .................................. 2016-226851

(51) Int. Cl.
*G09G 5/14* (2006.01)
*G06F 3/14* (2006.01)
(Continued)

(52) U.S. Cl.
CPC ............. *G09G 5/14* (2013.01); *G06F 3/0346* (2013.01); *G06F 3/0416* (2013.01); *G06F 3/1446* (2013.01); *G09G 5/38* (2013.01); *G06F 1/3231* (2013.01); *G06F 1/3265* (2013.01); *G09G 2300/026* (2013.01); *G09G 2330/026* (2013.01);
(Continued)

(58) Field of Classification Search
CPC .... G09G 5/14; G09G 5/38; G09G 2340/0478; G09G 2354/00; G09G 2380/02; G09G 2330/026; G09G 2300/026; G09G 2360/06; G06F 3/0416; G06F 3/0346; G06F 3/1446; G06F 1/3265; G06F 1/3231;
(Continued)

(56) References Cited

U.S. PATENT DOCUMENTS 8,836,842 B2 * 9/2014 Sirpal ................... G06F 3/1438
348/333.06
9,594,479 B2 * 3/2017 Oh ......................... G06F 3/0484
(Continued)

FOREIGN PATENT DOCUMENTS

JP 2005-174006 A 6/2005
JP 2012-69045 A 4/2012
(Continued)

OTHER PUBLICATIONS

Communication dated Jul. 21, 2020, from the Japanese Patent Office in Application No. 2016-226851.

*Primary Examiner* — Grant Sitta
(74) *Attorney, Agent, or Firm* — Sughrue Mion, PLLC

(57) ABSTRACT

A terminal device includes a display unit that includes a multidirectional image display face, an execution unit that executes a predetermined process in accordance with a user contact operation with respect to the image display face, a specifying unit that specifies a position of a user using the device, and a configuration unit that, on a basis of information about the position specified by the specifying unit, configures an operating face that accepts the contact operation in a facing region that faces the user's face on part of the image display face.

10 Claims, 14 Drawing Sheets

(51) Int. Cl.
  *G06F 3/0346* (2013.01)
  *G06F 3/041* (2006.01)
  *G09G 5/38* (2006.01)
  *G06F 1/3234* (2019.01)
  *G06F 1/3231* (2019.01)

(52) U.S. Cl.
  CPC . *G09G 2340/0478* (2013.01); *G09G 2354/00* (2013.01); *G09G 2360/06* (2013.01); *G09G 2380/02* (2013.01)

(58) Field of Classification Search
  CPC .. G06F 3/0482; G06F 3/04845; G06F 3/0485; G06F 3/0488
  See application file for complete search history.

(56) References Cited

U.S. PATENT DOCUMENTS

| | | | | |
|---|---|---|---|---|
| 10,015,748 B2* | 7/2018 | Agrawal | | H04W 52/0254 |
| 10,025,915 B2* | 7/2018 | Stewart | | G06F 21/32 |
| 2003/0085870 A1* | 5/2003 | Hinckley | | G06F 1/1626 |
| | | | | 345/156 |
| 2007/0075965 A1* | 4/2007 | Huppi | | H04M 1/72563 |
| | | | | 345/156 |
| 2008/0291225 A1* | 11/2008 | Arneson | | G06F 3/011 |
| | | | | 345/698 |
| 2010/0103098 A1* | 4/2010 | Gear | | G06F 1/1626 |
| | | | | 345/158 |
| 2010/0117975 A1* | 5/2010 | Cho | | G06F 1/1626 |
| | | | | 345/173 |
| 2010/0120470 A1* | 5/2010 | Kim | | G06F 1/1615 |
| | | | | 455/566 |
| 2011/0187681 A1* | 8/2011 | Kim | | G06F 1/1652 |
| | | | | 345/204 |
| 2011/0264928 A1* | 10/2011 | Hinckley | | G06F 1/1626 |
| | | | | 713/300 |
| 2012/0154294 A1* | 6/2012 | Hinckley | | G06F 1/1649 |
| | | | | 345/173 |
| 2012/0242599 A1* | 9/2012 | Seo | | G06F 1/1641 |
| | | | | 345/173 |
| 2013/0154970 A1* | 6/2013 | Seo | | G06F 1/1643 |
| | | | | 345/173 |
| 2013/0162556 A1* | 6/2013 | Yu | | G06F 3/041 |
| | | | | 345/173 |
| 2013/0249873 A1* | 9/2013 | Zhang | | G09G 3/22 |
| | | | | 345/204 |
| 2013/0321340 A1* | 12/2013 | Seo | | G06F 1/1641 |
| | | | | 345/174 |
| 2014/0043226 A1* | 2/2014 | Lee | | G06F 1/1626 |
| | | | | 345/156 |
| 2014/0184519 A1* | 7/2014 | Benchenaa | | G06F 3/0488 |
| | | | | 345/173 |
| 2014/0226275 A1 | 8/2014 | Ko et al. | | |
| 2014/0362513 A1* | 12/2014 | Nurmi | | G06F 1/1652 |
| | | | | 361/679.27 |
| 2014/0375702 A1* | 12/2014 | Cho | | G06F 1/3265 |
| | | | | 345/690 |
| 2015/0024728 A1* | 1/2015 | Jang | | H04M 1/72519 |
| | | | | 455/418 |
| 2015/0116362 A1* | 4/2015 | Aurongzeb | | H04N 7/15 |
| | | | | 345/650 |
| 2015/0355716 A1* | 12/2015 | Balasubramanian | ... | G06F 3/017 |
| | | | | 345/173 |
| 2016/0070338 A1* | 3/2016 | Kim | | G06F 3/0488 |
| | | | | 345/173 |
| 2016/0188181 A1* | 6/2016 | Smith | | G06F 3/045 |
| | | | | 715/765 |
| 2016/0274722 A1* | 9/2016 | Putzolu | | G06F 3/0416 |
| 2016/0291731 A1* | 10/2016 | Liu | | G06F 1/1656 |
| 2018/0129262 A1* | 5/2018 | Veiga | | G06F 1/162 |
| 2018/0267766 A1* | 9/2018 | Min | | G06F 1/1637 |

FOREIGN PATENT DOCUMENTS

| | | |
|---|---|---|
| JP | 2013-3248 A | 1/2013 |
| JP | 2014-123327 A | 7/2014 |
| JP | 5542886 B2 | 7/2014 |
| JP | 2014-161009 A | 9/2014 |
| JP | 5693966 B2 | 4/2015 |
| WO | 2009/094091 A1 | 7/2009 |
| WO | 2013/187137 A1 | 12/2013 |

* cited by examiner

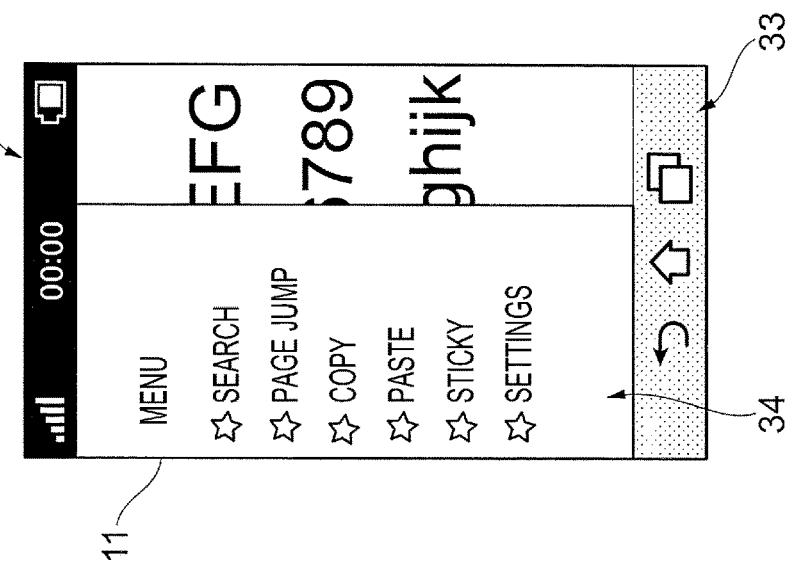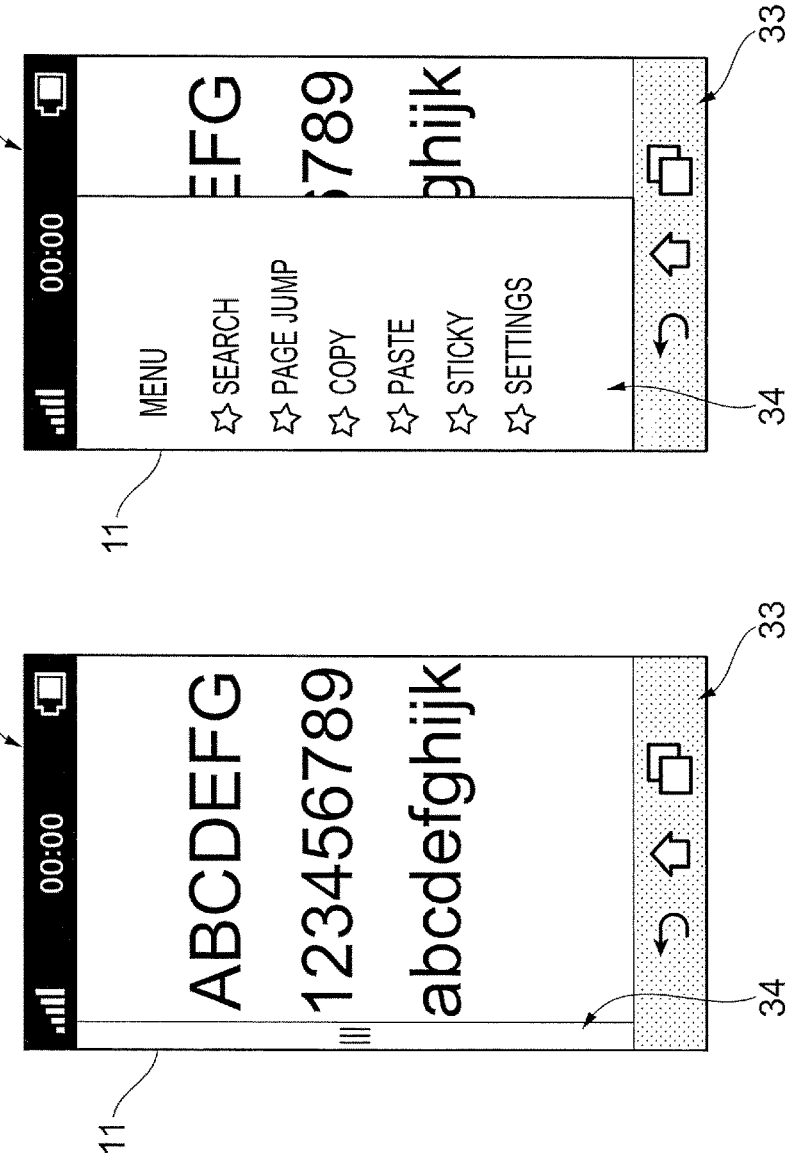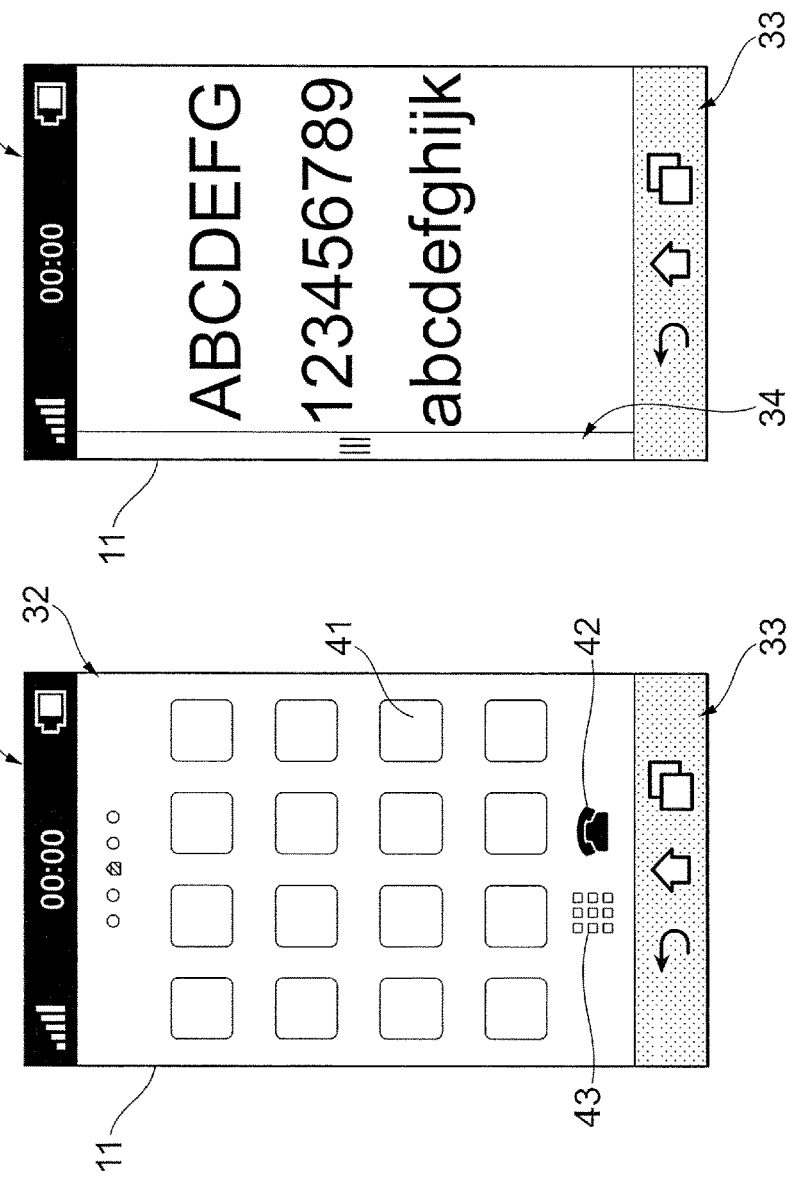

TERMINAL DEVICE AND NON-TRANSITORY COMPUTER-READABLE MEDIUM

CROSS-REFERENCE TO RELATED APPLICATIONS

This application is based on and claims priority under 35 USC 119 from Japanese Patent Application No. 2016-226851 filed Nov. 22, 2016.

BACKGROUND

Technical Field

The present invention relates to a terminal device and a non-transitory computer-readable medium.

Summary

According to an aspect of the invention, there is provided a terminal device including a display unit that includes a multidirectional image display face, an execution unit that executes a predetermined process in accordance with a user contact operation with respect to the image display face, a specifying unit that specifies a position of a user using the device, and a configuration unit that, on a basis of information about the position specified by the specifying unit, configures an operating face that accepts the contact operation in a facing region that faces the user's face on part of the image display face.

BRIEF DESCRIPTION OF THE DRAWINGS

Exemplary embodiments of the present invention will be described in detail based on the following figures, wherein:

FIGS. 4A to 4C are examples of images displayed on a display screen;

DETAILED DESCRIPTION

Hereinafter, exemplary embodiments of the present invention will be described with reference to the attached drawings.

Exemplary Embodiment 1

Figure 1A:
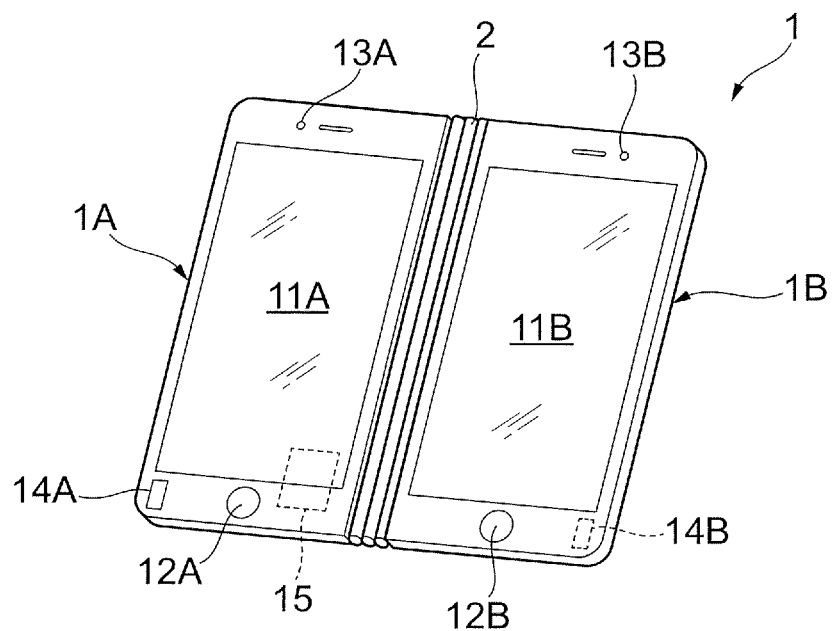
FIGS. 1A to 1C are overall views of a terminal device according to Exemplary Embodiment 1.
Figure 1B:
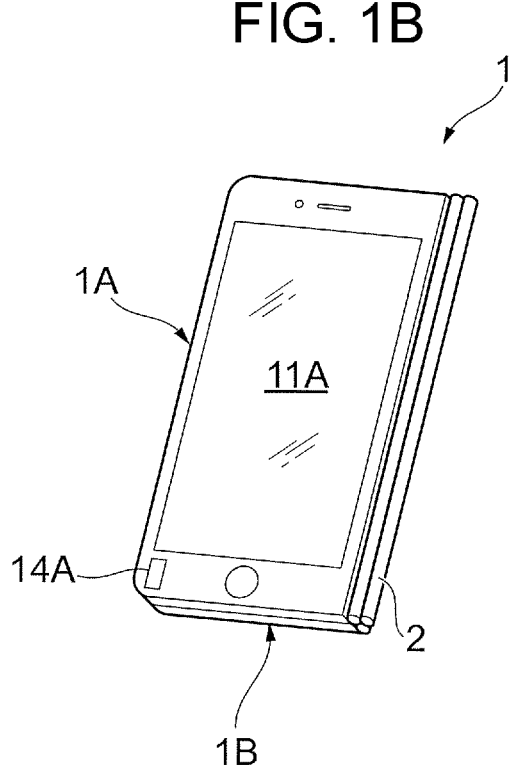
Figure 1C:
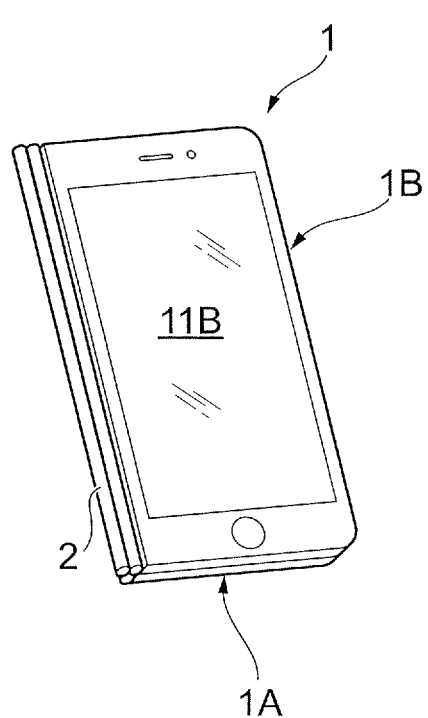

FIGS. 1A to 1C are overall views of a terminal device 1 according to Exemplary Embodiment 1.

As illustrated in FIG. 1A, the terminal device 1 according to Exemplary Embodiment 1 includes a first housing 1A, and a second housing 1B connected to the first housing 1A via a hinge 2. Additionally, as illustrated in FIGS. 1B and 1C, the first housing 1A and the second housing 1B rotate relative to each other, with the hinge 2 acting as the rotation axis.

Additionally, as illustrated in FIG. 1A, the terminal device 1 has an "open state" in which a first display screen 11A discussed later of the first housing 1A and a second display screen 11B discussed later of the second housing 1B are lined up facing in a similar direction. Also, the terminal device 1 has a "closed state" in which the first display screen 11A and the second display screen 11B face each other. Furthermore, as illustrated in FIGS. 1B and 1C, the terminal device 1 has a "double-sided screen state" in which the first display screen 11A and the second display screen 11B face in the front and back directions, respectively.

As illustrated in FIG. 1A, the first housing 1A includes the first display screen 11A, which is a screen that displays images, a first operating button 12A operated by a user, a first camera 13A that captures images of a photographic subject or the like, a first switch 14A that senses contact with a target object, and a controller 15 that conducts control.

The first display screen 11A displays images on the basis of control by the controller 15. Also, the first display screen 11A is made to function as a touch panel, and senses touch operations (contact operations) performed by the user's finger or the like. Additionally, in the terminal device 1, when the user performs a touch operation on the first display screen 11A, a predetermined process is executed in response to the touch operation.

Note that a display such as a liquid crystal display or an organic EL display may be used as the first display screen 11A, for example. Also, for the configuration of the touch panel, various methods such as capacitive touch sensing and resistive touch sensing may be used.

In Exemplary Embodiment 1, the first operating button 12A is provided on the same face as the first display screen 11A. The first operating button 12A is a button realized by a mechanical structure. Additionally, the first operating button 12A accepts user operations separately from the first display screen 11A that functions as a touch panel. In the present exemplary embodiment, when the first operating button 12A is depressed, a home screen image 32 discussed later is displayed on the first display screen 11A, for example.

In Exemplary Embodiment 1, the first camera 13A is provided on the same face as the first display screen 11A. Additionally, the first camera 13A captures an image or video of a subject.

In Exemplary Embodiment 1, the first switch 14A is provided on the same face as the first display screen 11A. Additionally, the first switch 14A senses contact with the second display screen 11B of the second housing 1B. In the terminal device 1 of Exemplary Embodiment 1, the contact sensing by the first switch 14A is used to determine that the terminal device 1 is in the closed state.

The controller 15 centrally controls the terminal device 1 as a whole. For example, the controller 15 conducts various controls, such as the control of power to the first housing 1A and the second housing 1B, control of the display of images displayed on the first display screen 11A, and control of communication over a network or the like.

The second housing 1B includes a second display screen 11B, a second operating button 12B, a second camera 13B, and a second switch 14B.

In Exemplary Embodiment 1, the configuration of the second housing 1B is similar to the first housing 1A. Specifically, the second display screen 11B, the second operating button 12B, and the second camera 13B are the same as the first display screen 11A, the first operating button 12A, and the first camera 13A of the first housing 1A, respectively.

Note that in the following description, the first display screen 11A and the second display screen 11B will be collectively designated the display screens 11 when not being distinguished individually.

The second switch 14B is provided on the face of the second housing 1B, on the side opposite from the second display screen 11B. Additionally, the second switch 14B senses contact with the first housing 1A on the side opposite from first display screen 11A. In Exemplary Embodiment 1, the contact sensing by the second switch 14B is used to determine that the terminal device 1 is in the double-sided screen state.

Furthermore, in Exemplary Embodiment 1, when contact is sensed by neither the first switch 14A nor the second switch 14B, the terminal device 1 is determined to be in the open state.

Note that in Exemplary Embodiment 1, the first display screen 11A and the second display screen 11B (that is, the display screens 11) function as an example of an image display face that faces in multiple directions, while the first housing 1A and the second housing 1B function as an example of a display unit.

Next, a hardware configuration of the terminal device 1 will be described.

Figure 2:
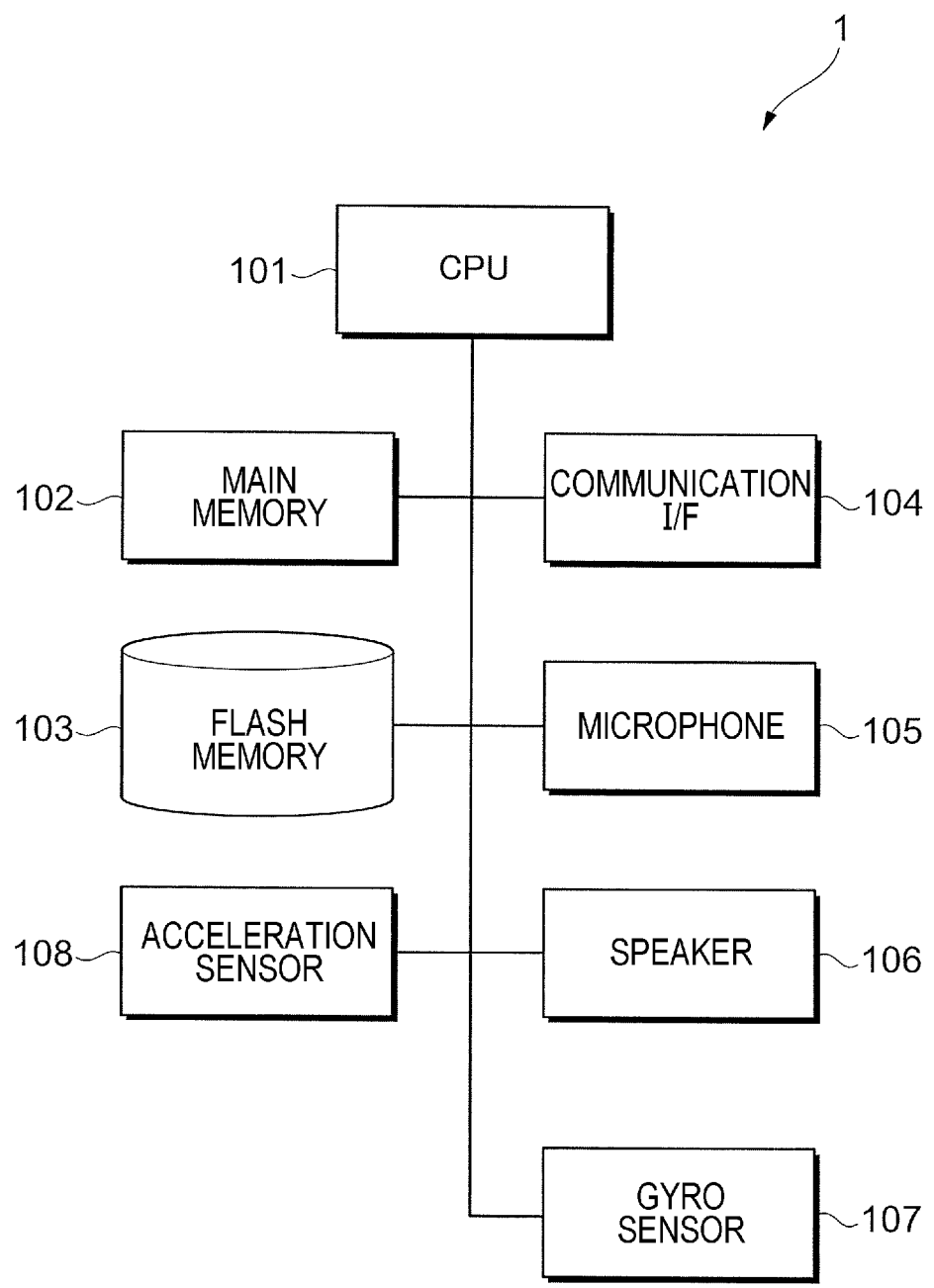
FIG. 2 is a diagram illustrating an exemplary hardware configuration of a terminal device according to Exemplary Embodiment 1.

FIG. 2 is a diagram illustrating an exemplary hardware configuration of the terminal device 1 according to Exemplary Embodiment 1.

As illustrated in FIG. 2, the terminal device 1 is equipped with a CPU 101 that acts as a computational unit, as well as main memory 102 and flash memory 103 that act as storage. Additionally, the terminal device 1 is equipped with a communication I/F 104 for communicating with external equipment, a microphone 105 that acquires sound, a speaker 106 that outputs sound, a gyro sensor 107 that senses the orientation of the terminal device 1, and an acceleration sensor 108 that senses the motion of the terminal device 1.

The CPU 101 executes various programs, such as an operating system (OS) and application software, and thereby realizes the respective functions of the terminal device 1. Also, the main memory 102 is a storage area that stores information such as various programs and data used in the execution of such programs, while the flash memory 103 is a storage area that stores information such as input data for various programs and output data from various programs.

In the terminal device 1 of Exemplary Embodiment 1 configured as above, the display mode of images with respect to the first display screen 11A and the second display screen 11B is made to be different in some cases, depending on the state of the terminal device 1.

Specifically, when the terminal device 1 is in the closed state, in some cases the terminal device 1 does not display images on the first display screen 11A and the second display screen 11B, thus putting the screens to sleep so to speak.

Also, when the terminal device 1 is in the open state, in some cases the terminal device 1 may display separate images on the first display screen 11A and the second display screen 11B, or display a single continuous image spanning both screens.

Furthermore, when the terminal device 1 is in the double-sided screen state, the terminal device 1 conducts an operating face configuration process, which is a process of configuring one of the first display screen 11A and the second display screen 11B as an operating face 11p that accepts user touch operations (see FIG. 5A discussed later), while configuring the other as a non-operating face 11n that does not accept user touch operations (see FIG. 5B discussed later).

Note that in the description of the exemplary embodiments, not accepting touch operations on a display screen 11 means disabling the execution of processes in response to touch contact. Consequently, even if a display screen 11 is configured not to accept touch operations, contact by the user with respect to the display screen 11 is still sensed.

Additionally, the terminal device of Exemplary Embodiment 1 includes a contact mode that conducts the operating face configuration process on the basis of the contact surface area on the display screens 11, and a laid-flat mode that conducts the operating face configuration process on the basis of the installation state of the terminal device 1. The operating face configuration process, including the contact mode and the laid-flat mode, will be described in detail later.

Figure 3:
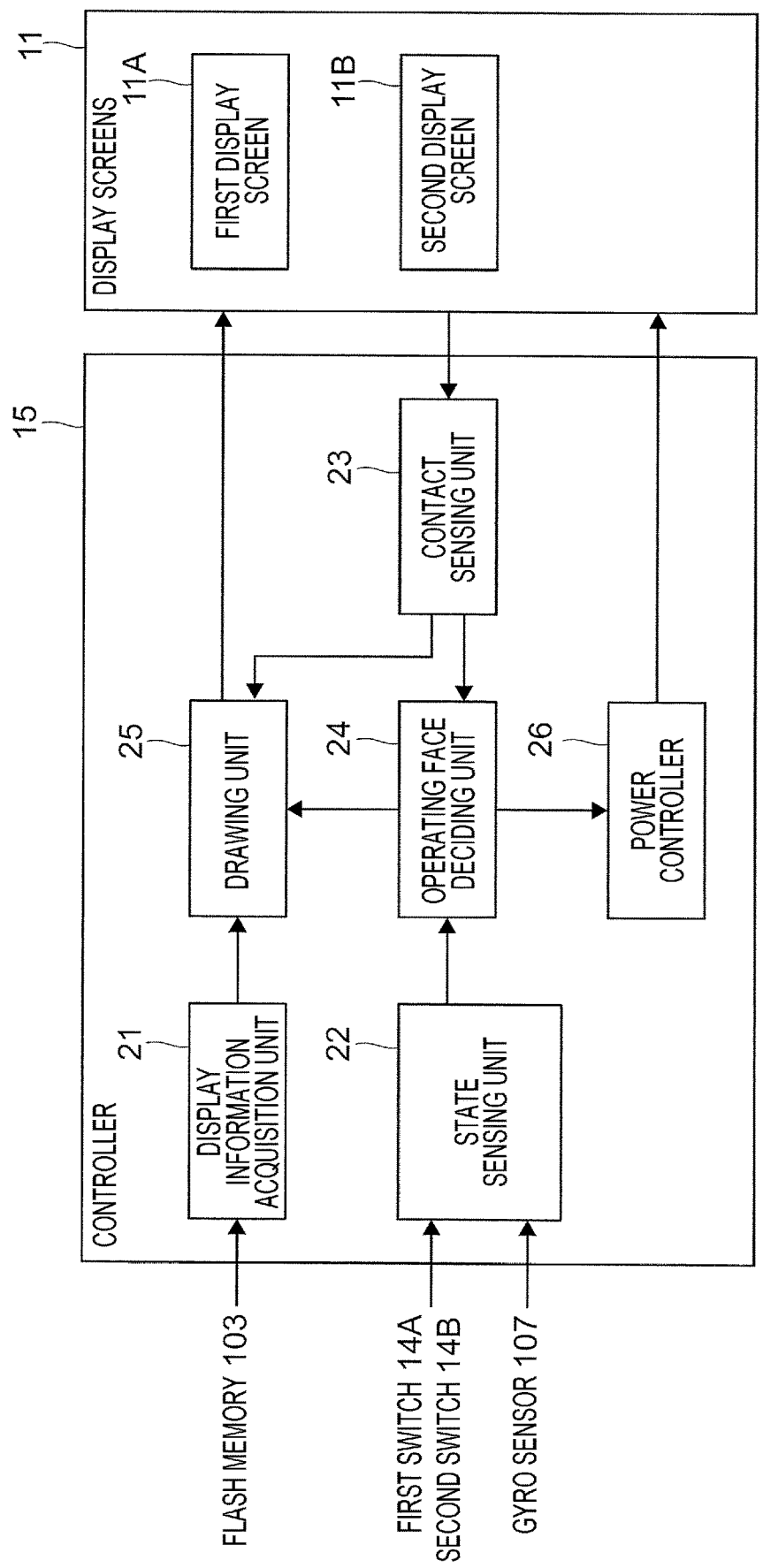
FIG. 3 is a function block diagram of a controller that realizes an operating face configuration process according to Exemplary Embodiment 1.

Next, the operating face configuration process will be described in detail. FIG. 3 is a function block diagram of the controller 15 that realizes the operating screen configuration process according to Exemplary Embodiment 1. FIGS. 4A to 4C are examples of images displayed on the display screens 11. Note that FIG. 4A illustrates an example of a home screen, while FIGS. 4B and 4C illustrate an example of a menu screen.

As illustrated in FIG. 3, the controller 15 (an example of an execution unit) includes a display information acquisition unit 21 that acquires information to display, a state sensing unit 22 (an example of a motion sensing unit) that senses the state of the terminal device 1, and a contact sensing unit 23 that senses contact on the display screens 11. In addition, the controller 15 includes an operating face deciding unit 24 (an example of a configuration unit) that decides the operating face 11p and the non-operating face 11n, a drawing unit 25 (an example of a display controller) that draws images, and a power controller 26 that controls power. Note that in the present exemplary embodiment, the contact sensing unit 23 and the operating face deciding unit 24 function as an example of a specifying unit.

The display information acquisition unit 21 acquires display information to be displayed on the display screens 11 from the flash memory 103 of the terminal device 1, or from an external source over a network or the like. Subsequently, the display information acquisition unit 21 sends the acquired display information to the drawing unit 25.

More specifically, as illustrated in FIG. 4A, the display information acquisition unit 21 acquires display information such as a status display image 31 that displays the condition of the terminal device 1, a home screen image 32, and a resident button image 33 that is permanently displayed even when the screen changes.

Furthermore, the display information acquisition unit 21 acquires images when executing various applications, such as for telephone operations, Internet browsing, the recording of images, the viewing of still images and video, and games. Furthermore, as illustrated in FIGS. 4B and 4C, when executing various applications, the display information acquisition unit 21 acquires an app menu image 34 for each application.

As illustrated in FIG. 4A, the status display image 31 displays information such as the current time, the strength of a received radio signal, and the remaining battery level. Also, the home screen image 32 is a screen that acts as the foundation for all operations. In other words, the home screen image 32 is a screen that acts as a starting point for performing operations to execute functions provided in the terminal device 1. Specifically, the home screen image 32 displays information such as app icons 41 for launching respective applications, a telephone button image 42 for making telephone calls, and a list display button image 43 for displaying a list of icons representing applications not being displayed on the home screen. The resident button image 33 displays information such as a Home button for display the home screen, a Back button that goes back to the previously displayed screen, and an Task Switcher button for switching between launched applications.

As illustrated in FIG. 4B, only a part of the app menu image 34 is displayed at the edge of the display screen 11 when in the closed state. Subsequently, as illustrated in FIG. 4C, when the user slides out the app menu image 34 with a touch operation, the entire app menu image 34 is expanded onto the display screen 11.

As illustrated in FIG. 3, the state sensing unit 22 determines the hinge state of the terminal device 1 (that is, the open state, the closed state, or the double-sided screen state), on the basis of the contact sensing by the first switch 14A and the second switch 14B. Subsequently, the state sensing unit 22 sends state information about the determined state of the terminal device 1 to the operating face deciding unit 24. Also, the state sensing unit 22 acquires direction information about the orientation of the terminal device 1, on the basis of a sensing result from the gyro sensor 107. Subsequently, the state sensing unit 22 sends the acquired direction information about the terminal device 1 to the operating face deciding unit 24.

The contact sensing unit 23 detects user touch operations with respect to the display screens 11 that function as touch panels. Subsequently, the contact sensing unit 23 sends information about the detected user touch operations to the drawing unit 25. Also, the contact sensing unit 23 calculates the respective contact surface area on the first display screen 11A and the second display screen 11B. Subsequently, the contact sensing unit 23 sends contact surface area information related to the contact surface area on the first display screen 11A and the second display screen 11B to the operating face deciding unit 24.

The operating face deciding unit 24 specifies (estimates) the position of the user operating the terminal device 1, on the basis of the state information about the terminal device 1 acquired from the state sensing unit 22, and the contact surface area information acquired from the contact sensing unit 23. Subsequently, the operating face deciding unit 24 decides the operating face 11$p$ and the non-operating face 11$n$ with respect to the display screens 11. Subsequently, the operating face deciding unit 24 sends configuration information related to the decided operating face 11$p$ and the non-operating face 11$n$ to the drawing unit 25 and the power controller 26. Note that specific details about the deciding of the operating face 11$p$ and the non-operating face 11$n$ by the operating face deciding unit 24 will be described in detail later.

The drawing unit 25 displays images on the operating face 11$p$ configured by the operating face deciding unit 24, on the basis of the display information acquired from the display information acquisition unit 21. Additionally, the drawing unit 25 controls the display of images on the display screens 11, in response to touch operations performed on the display screens 11 by the user and detected by the contact sensing unit 23.

The power controller 26 conducts control to turn on or turn off power to the first display screen 11A or the second display screen 11B. Also, the power controller 26 controls the power on the basis of the configuration information about the operating face 11$p$ and the non-operating face 11$n$ acquired from the operating face deciding unit 24. Note that the specific details of the power control with respect to the display screens 11 by the power controller 26 will be described later.

Operating Face Configuration Process of Exemplary Embodiment 1

Figure 5A:
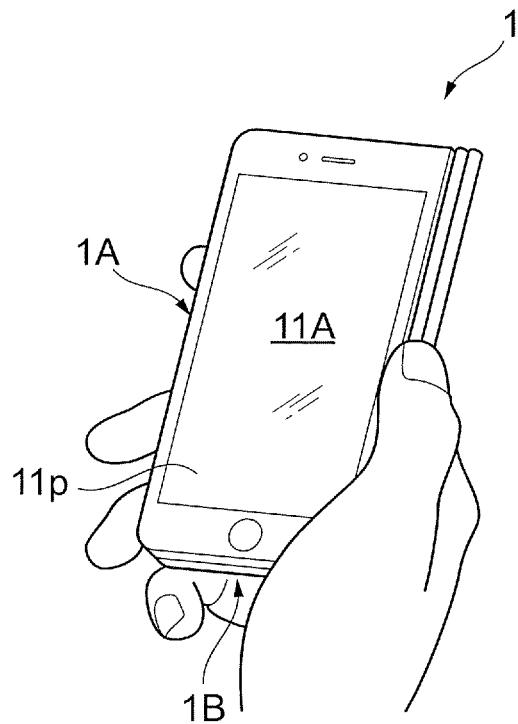
FIGS. 5A to 5C are diagrams illustrating a user holding a terminal device in the double-sided screen state.

Next, the operating face configuration process (contact mode, laid-flat mode) of Exemplary Embodiment 1 conducted by the controller 15 will be described in detail. FIGS. 5A to 5C are diagrams illustrating a user holding the terminal device 1 in the double-sided screen state. Note that FIG. 5A is a diagram of the terminal device 1 as viewed from the user's point of view, while FIG. 5B is a diagram of the terminal device 1 as viewed from the back of the user's hand. FIGS. 6A and 6B are explanatory diagrams when activating a camera during the operating face configuration process.

(Contact mode)

First, the contact mode in the operating face configuration process will be described. In the operating face configuration process, contact surface area information about the first display screen 11A and the second display screen 11B is acquired. In Exemplary Embodiment 1, the first display screen 11A and the second display screen 11B function as touch panels. For this reason, in the terminal device 1, the contact surface area of a contacting object on the first display screen 11A and the second display screen 11B is obtained.

Figure 5B:
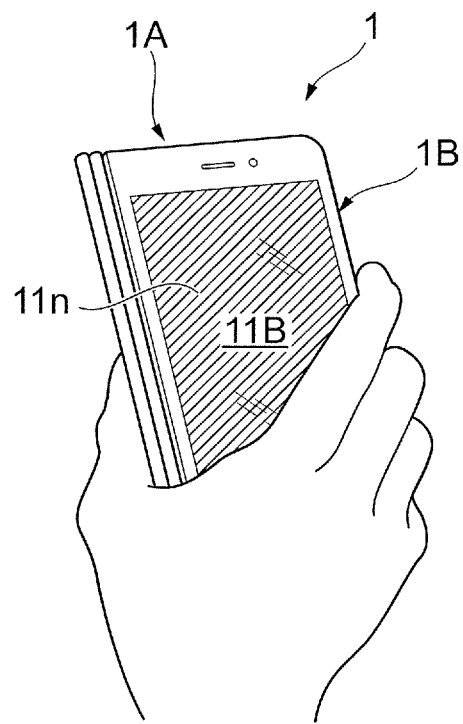
Figure 5C:
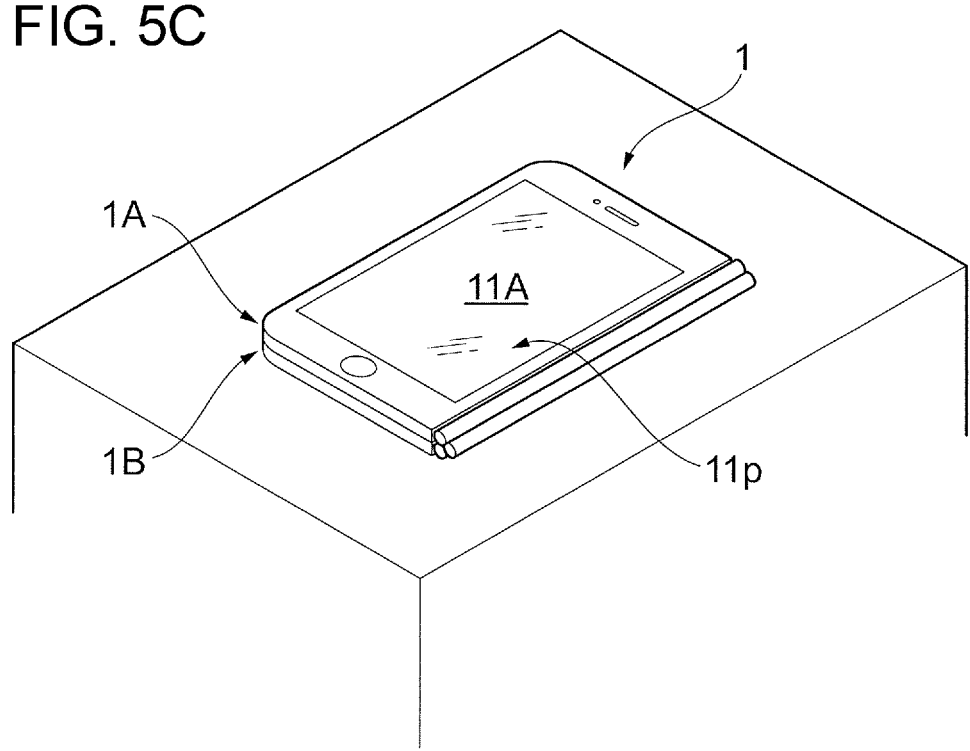
Figure 6A:
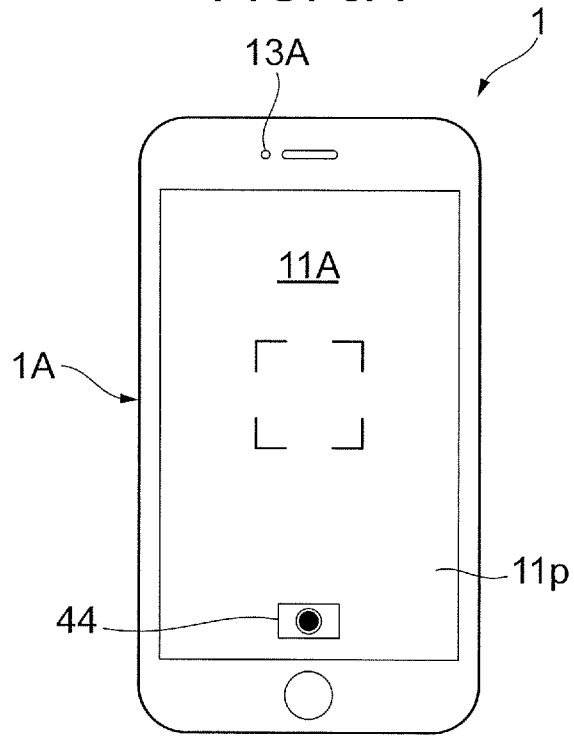
FIGS. 6A and 6B are explanatory diagrams when activating a camera during an operating face configuration process.
Figure 6B:
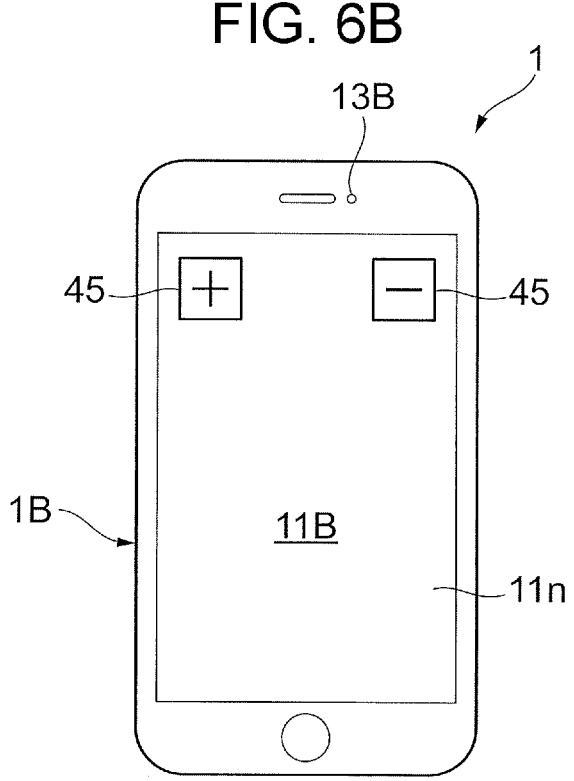

For example, as illustrated in FIGS. 5A and 5B, suppose that the user is holding the terminal device 1 in the double-sided screen state in his or her hand, and is looking at a display screen 11. In this example, the first display screen 11A side faces the user's face, while the second display screen 11B side faces the user's palm. In the terminal device 1 in this state, whereas just the user's finger may or may not be touching the first display screen 11A, the user's palm contacts the second display screen 11B. Consequently, the contact surface area on the second display screen 11B is large compared to the first display screen 11A.

In the situation described above, the operating face deciding unit 24 decides the first display screen 11A as the operating face 11$p$ that accepts touch panel operations. Meanwhile, the operating face deciding unit 24 decides the second display screen 11B as the non-operating face 11$n$ that does not accept touch panel operations.

Note that when configuring the display screen having the comparatively greater contact surface area from among the first display screen 11A and the second display screen 11B as the non-operating face 11n, a condition may be added that contact surface area equal to or greater than a fixed surface area exists with respect to the display screens 11. This fixed surface area is greater than the contact by the user's finger, for example, and is determined on the basis of the contact surface area when the user's palm is touching. Consequently, in the operating face configuration process, the accuracy of determining that the user's palm is contacting a display screen 11 may be increased.

Additionally, in the operating face configuration process, the home screen image 32 (see FIG. 4A) is displayed on the first display screen 11A configured as the operating face 11p. In the case of this example, the second display screen 11B is configured not to accept touch operations. For this reason, in Exemplary Embodiment 1, the home screen image 32 is prioritized for display on the first display screen 11A configured as the operating face 11p. Meanwhile, in the operating face configuration process, an image is not displayed on the second display screen 11B configured as the non-operating face 11n.

As above, in the terminal device 1 of Exemplary Embodiment 1, a display relevant to the user (for example, the display of the home screen image 32) is displayed in front of the user's face, in accordance with how the user is holding the terminal device 1 in hand. In other words, in the terminal device 1 of Exemplary Embodiment 1, the position of the user is substantially detected, and front-facing data is displayed to the user in accordance with the detected position of the user.

Also, in the operating face configuration process of Exemplary Embodiment 1, a process of turning off power to the second display screen 11B is conducted via the power controller 26. This is because the second display screen 11B is configured not to accept touch operations, and thus a supply of power to the second display screen 11B is unnecessary. Note that not only power to the second display screen 11B but also power to the second housing 1B may be turned off.

Note that the process is not limited to performing an operation of turning off power to the second display screen 11B or the second housing 1B. For example, a specific image may also be displayed on the second display screen 11B while the second display screen 11B is configured as the non-operating face 11n.

The above example illustrates a case in which the user's palm is contacting the second display screen 11B, but in a case in which the user's palm is contacting the first display screen 11A and the user is looking at the second display screen 11B, the contact surface area on the first display screen 11A becomes greater than the second display screen 11B. In this case, the first display screen 11A is configured as the non-operating face 11n, while the second display screen 11B is configured as the operating face 11p.

In addition, the terminal device 1 may also specify (sense) the position of the user operating the terminal device 1 on the basis of the first camera 13A and the second camera 13B, and configure the operating face 11p and the non-operating face 11n with respect to the display screens 11 accordingly. For example, if one of either the first camera 13A or the second camera 13B senses the face of the user holding the terminal device 1, the display screen 11 on the side provided with that camera is configured as the operating face 11p. Meanwhile, the display screen 11 on the side provided with the camera unable to sense the user's face is configured as the non-operating face 11n.

Note that in Exemplary Embodiment 1, the configuration of the operating face 11p and the non-operating face 11n by the operating face configuration process is cancelled when an operation of cancelling the operating face configuration is performed by the user, or when the terminal device 1 is changed to the open state.

Next, a case in which a camera is activated during the operating face configuration process will be described with reference to FIGS. 6A and 6B. Note that the following example will be described using a case in which the operating face configuration process has already configured the first display screen 11A as the operating face 11p and the second display screen 11B as the non-operating face 11n.

As illustrated in FIGS. 6A and 6B, when recording with a camera, an image of a subject or the like captured by the second camera 13B is displayed on the first display screen 11A. Subsequently, recording is conducted on the basis of a user touch operation performed on a Record button image 44 displayed on the first display screen 11A. Meanwhile, rear-face operating button images 45 related to camera recording are displayed on the second display screen 11B. In Exemplary Embodiment 1, the rear-face operating button images 45 are a zoom-in button used to enlarge the subject, and a zoom-out button used to reduce the subject. Additionally, user operations on the second display screen 11B configured as the non-operating face 11n are accepted temporarily.

As above, when a specific application is being executed on the display screen 11 configured as the operating face 11p, the image displayed on the display screen 11 configured as the non-operating face 11n is changed, and in addition, operations on the display screen 11 configured as the non-operating face 11n are enabled temporarily. Note that although the above example describes the case of camera recording as an example of the application, the application may also be another application such as a game.

(Laid-flat mode)

Next, the laid-flat mode in the operating face configuration process of Exemplary Embodiment 1 will be described. As illustrated in FIG. 5C, in the terminal device 1 of Exemplary Embodiment 1, a laid-flat mode is executed when the terminal device 1 in the double-sided screen state is placed on a flat surface such as a table. In laid-flat mode, the orientation of the terminal device 1 is ascertained on the basis of a sensing result from the gyro sensor 107 (see FIG. 2). Furthermore, when the terminal device 1 is placed in a horizontal direction, the top-and-bottom orientation of the terminal device 1 is sensed. Subsequently, in laid-flat mode, the display screen 11 positioned on the bottom side of the terminal device 1 is configured as the non-operating face 11n, while the display screen 11 positioned on the top side of the terminal device 1 is configured as the operating face 11p. Additionally, in Exemplary Embodiment 1, nothing is displayed on the display screen 11 on the bottom side. Note that in laid-flat mode, power may also be turned off for the first housing 1A or the second housing 1B which is arranged on the bottom side of the terminal device 1.

Figure 7:
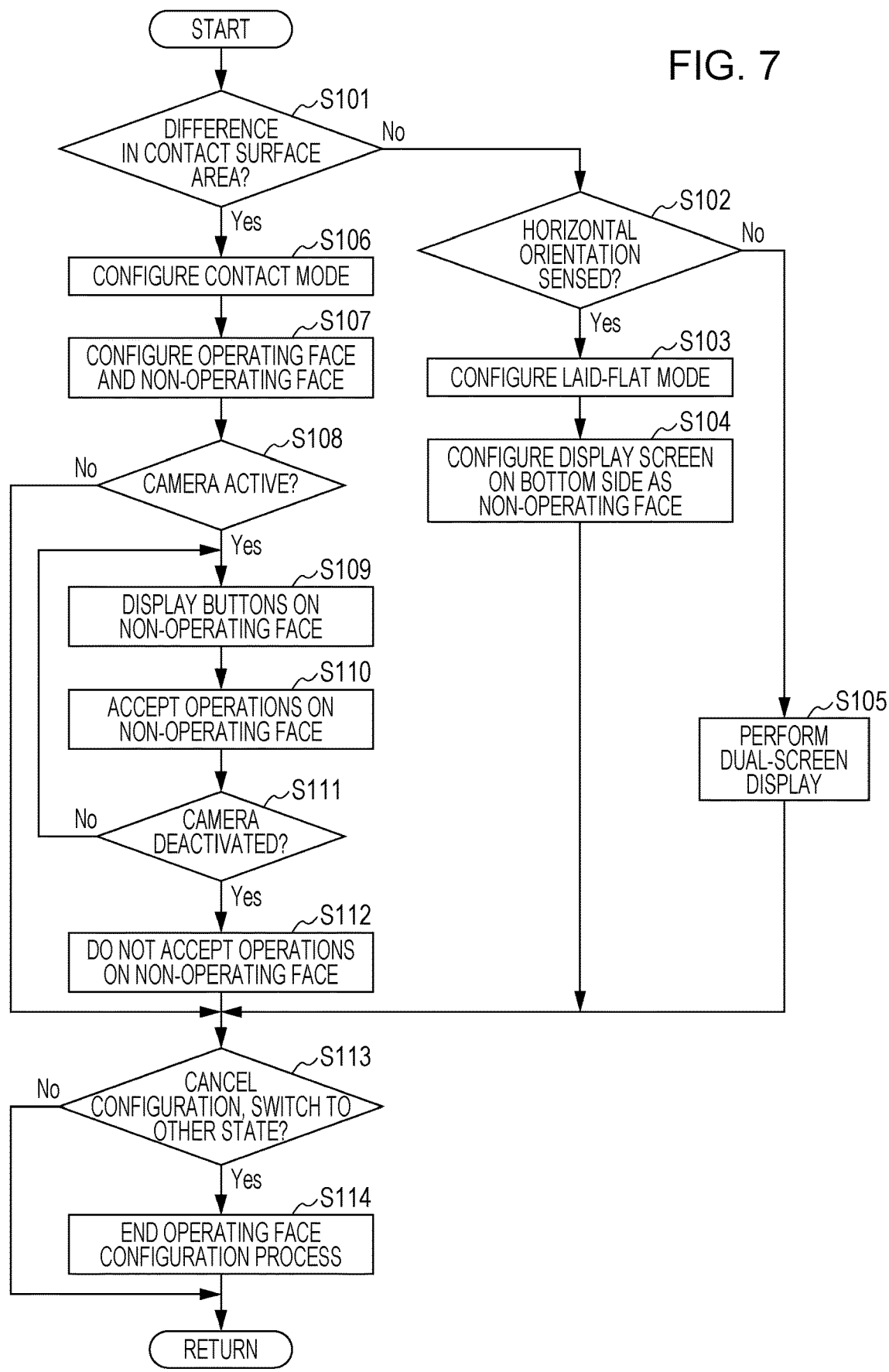
FIG. 7 is an operational flowchart of an operating face configuration process according to Exemplary Embodiment 1.

Next, the operating face configuration process executed by the controller 15 of the terminal device 1 according to Exemplary Embodiment 1 will be described. FIG. 7 is an operational flowchart of the operating face configuration process according to Exemplary Embodiment 1. In the terminal device 1 in the double-sided screen state, it is determined whether or not a difference exists in the contact surface area of the first display screen 11A and the second display screen 11B (S101). In S101, if there is not difference in the contact surface area (S101, No), it is determined whether or not the orientation of the terminal device 1 is horizontal (S102). In S102, if the terminal device 1 is placed horizontally (S102, Yes), the laid-flat mode is configured (S103). Subsequently, the screen positioned on the bottom side from among the first display screen 11A and the second display screen 11B is configured as the non-operating face 11n (S104). Also, in S102, if the terminal device 1 is not horizontal (S102, No), a dual-screen display that displays respective images on both the first display screen 11A and the second display screen 11B is conducted (S105).

Meanwhile, in S101, if there is a difference in the surface contact area (S101, Yes), the contact mode is configured (S106). Subsequently, the display screen 11 having the smaller surface contact area (including zero) from among the first display screen 11A and the second display screen 11B is configured as the operating face 11p, while the display screen 11 having the greater surface contact area is configured as the non-operating face 11n (S107).

Next, it is determined whether or not a camera is active (S108). If a camera is not active (S108, No), the flow proceeds to S113. If a camera is active (S108, Yes), an image of the subject is displayed on the display screen 11 configured as the operating face 11p. Furthermore, if the camera is active (S108, Yes), the rear-face operating button images 45 (see FIG. 6B), which are button images related to the operation of the camera, are displayed on the display screen 11 configured as the non-operating face 11n (S109). Additionally, touch operations on the display screen 11 configured as the non-operating face 11n are accepted temporarily (S110).

After that, it is determined whether or not the camera has been deactivated (S111). If the camera has not been deactivated (S111, No), the flow returns to S109. Meanwhile, if the camera has been deactivated (S111, Yes), the display screen 11 configured as the non-operating face 11n once again is configured not to accept touch operations (S112).

After that, it is determined whether the operating face configuration has been cancelled, or the state has been switched from the double-sided screen state to another state (S113). In S113, if the configuration has not been cancelled and the state has not been switched to another state (S113, No), the flow returns to S101. Meanwhile, in S113, if the configuration has been cancelled or the state has been switched to another state (S113, Yes), the operating face configuration process ends (S114).

Exemplary Embodiment 2

Next, a terminal device 5 according to Exemplary Embodiment 2 will be described. Note that in the description of Exemplary Embodiment 2, parts of the configuration which are similar to the configuration described in Exemplary Embodiment 1 are denoted with the same signs, and detailed description thereof is reduced or omitted.

Figure 8A:
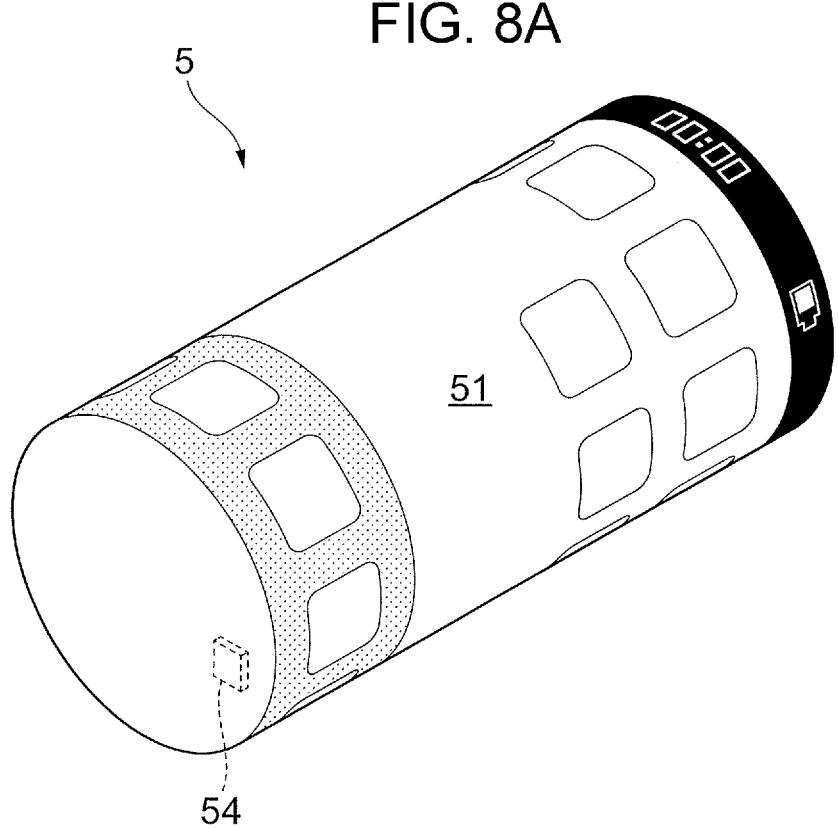
FIGS. 8A and 8B are overall perspective views of a terminal device according to Exemplary Embodiment 2.
Figure 8B:
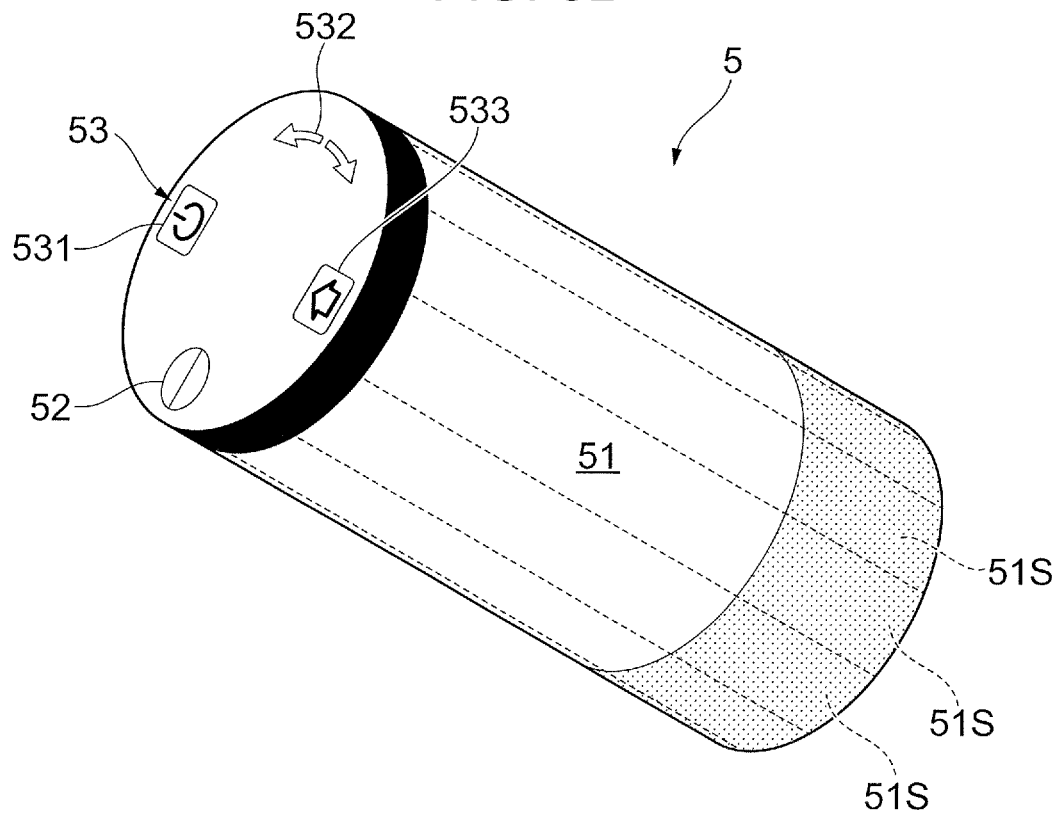

FIGS. 8A and 8B are overall perspective views of the terminal device 5 according to Exemplary Embodiment 2. As illustrated in FIGS. 8A and 8B, the terminal device 5 includes a display screen 51 (an example of an image display face) that displays images, a camera 52, operating buttons 53, and a controller 54. Note that the hardware configuration of the terminal device 5 is similar to the terminal device 1 (see FIG. 2).

The display screen 51 is formed in a cylindrical shape to form an omnidirectional (360°) display face. In other words, the display screen 51 faces in multiple directions. Also, the display screen 51 is made to function as a touch panel, and senses touch operations performed by the user's finger or the like. Note that a display such as an organic EL display may be used as the display screen 51, for example.

As illustrated in FIG. 8B, the operating buttons 53 include a power button 531, operating keys 532, and a home screen display button 533. The power button 531 turns on or turns off power to the terminal device 5 as a whole. The operating keys 532 are used to adjust the volume when sound is being output, or to perform operations on the display screen 51, for example. The home screen display button 533 is a button for displaying the home screen image 32 (see FIG. 4A) on the display screen 51.

The controller 54 centrally controls the terminal device 5 as a whole. The controller 54 conducts various controls, such as the control of the power to the terminal device 5 as a whole, control of the display of images displayed on the display screen 51, and control of communication over a network or the like.

In the terminal device 5 of Exemplary Embodiment 2 configured as above, the display mode and the operating mode of images on the display screen 51 are made to be different in some cases, depending on the state of contact with the display screen 51 by the user's hand or the like. Specifically, the terminal device 5 presents an omnidirectional display that displays an image around the full perimeter of the display screen 51 in cases such as when the display screen 51 is not being gripped and held by the user. Note that in this case, the terminal device 5 accepts touch operations on the display screen 51 over the full perimeter of the display screen 51.

In addition, when the display screen 51 is being gripped and held by the user, the terminal device 5 conducts an operating face configuration process that configures respective parts of the display screen 51 as an operating face 51p that accepts user touch operations (see FIG. 10A discussed later) and a non-operating face 51n that does not accept user touch operations (see FIG. 10B discussed later). Additionally, in Exemplary Embodiment 2, an image is displayed on the operating face 51p, while an image is not displayed on the non-operating face 51n. Hereinafter, the operating face configuration process according to Exemplary Embodiment 2 will be described in detail.

Figure 9:
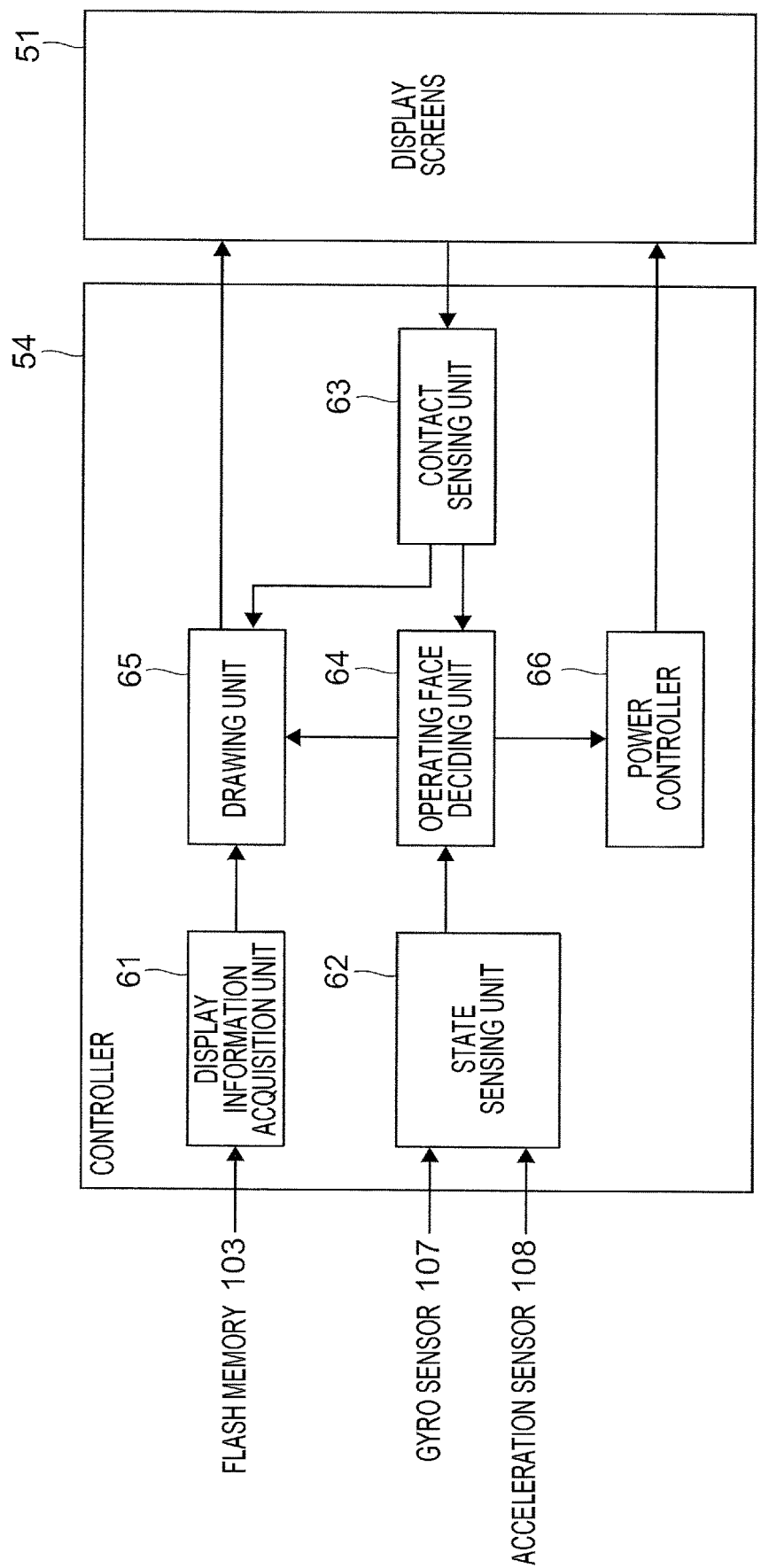
FIG. 9 is an explanatory diagram of functions of a controller according to Exemplary Embodiment 2.

FIG. 9 is an explanatory diagram of the functions of the controller 54 according to Exemplary Embodiment 2. As illustrated in FIG. 9, the controller 54 (an example of an execution unit) includes a display information acquisition unit 61 that acquires information to display, a state sensing unit 62 that senses the state of the terminal device 5, and a contact sensing unit 63 that senses contact on the display screen 51. In addition, the controller 54 includes an operating face deciding unit 64 (an example of a configuration unit) that decides the operating face 51p and the non-operating face 51n, a drawing unit 65 (an example of a display controller) that draws images, and a power controller 66 that controls power. Note that in the present exemplary embodiment, the contact sensing unit 63 and the operating face deciding unit 64 function as an example of a specifying unit.

The display information acquisition unit 61 acquires display information to be displayed on the display screen 51 from the flash memory 103 of the terminal device 5, or from an external source over a network or the like. Subsequently, the display information acquisition unit 61 sends the acquired display information to the drawing unit 65.

The state sensing unit 62 acquires direction information about the orientation of the terminal device 5, on the basis of a sensing result from the gyro sensor 107. Subsequently, the state sensing unit 62 sends the acquired direction information about the terminal device 5 to the operating face deciding unit 64. Also, the state sensing unit 62 acquires motion information about the motion of the terminal device 5, on the basis of a sensing result from the acceleration sensor 108. Subsequently, the state sensing unit 62 sends the acquired motion information about the terminal device 5 to the operating face deciding unit 64.

The contact sensing unit 63 detects user touch operations with respect to the display screen 51 that functions as a touch panel. Subsequently, the contact sensing unit 63 sends information about the detected user touch operation to the drawing unit 65. Additionally, the contact sensing unit 63 partitions the display screen 51 into multiple sectional regions 51S at predetermined intervals in the circumferential direction, for example (see FIG. 8B). Each sectional region 51S has a predetermined width in the circumferential direction of the terminal device 5, and extends from one end to the other end in the axial direction. Additionally, the contact sensing unit 63 computes the contact surface area of user contact for each of the multiple sectional regions 51S of the display screen 51. Subsequently, the contact sensing unit 63 sends contact surface area information related to the contact surface area about each sectional region 51S of the display screen 51 to the operating face deciding unit 64.

The operating face deciding unit 64 specifies (estimates) the position of the user operating the terminal device 5, on the basis of the contact surface area information acquired from the contact sensing unit 63. Subsequently, the operating face deciding unit 64 decides the operating face 51p and the non-operating face 51n with respect to the display screen 51. Subsequently, the operating face deciding unit 64 sends configuration information related to the decided operating face 51p and the non-operating face 51n to the drawing unit 65 and the power controller 66. Note that specific details about the deciding of the operating face 51p and the non-operating face 51n by the operating face deciding unit 64 will be described in detail later.

The drawing unit 65 displays images on the operating face 51p configured by the operating face deciding unit 64, on the basis of the display information acquired from the display information acquisition unit 61. Additionally, the drawing unit 65 controls the display of images on the display screen 51, in response to touch operations performed on the display screen 51 by the user and detected by the contact sensing unit 63.

The power controller 66 conducts control to turn on or turn off power to the display screen 51. Also, the power controller 66 controls the power on the basis of the configuration information about the operating face 51p and the non-operating face 51n acquired from the operating face deciding unit 64. Note that the specific details of the power control with respect to the display screen 51 by the power controller 66 will be described later.

Operating Face Configuration Process of Exemplary Embodiment 2

Next, the operating face configuration process according to Exemplary Embodiment 2 will be described in detail. FIGS. 10A and 10B are diagrams illustrating states of a user holding the terminal device 5. In the operating face configuration process, first, contact surface area information related to the contact surface area of the user's hand or the like on the display screen 51 is acquired. In Exemplary Embodiment 2, the display screen 51 is a touch panel. For this reason, in the operating face configuration process, the contact surface area of a contacting object on the display screen 51 is obtained.

Figure 10B:
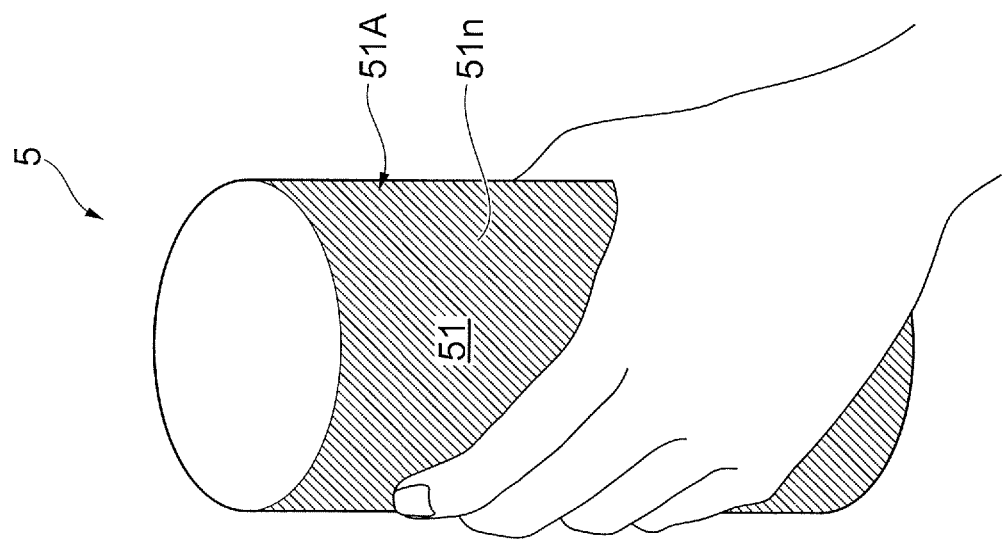
FIGS. 10A and 10B are diagrams illustrating states of a user holding a terminal device.
Figure 10A:
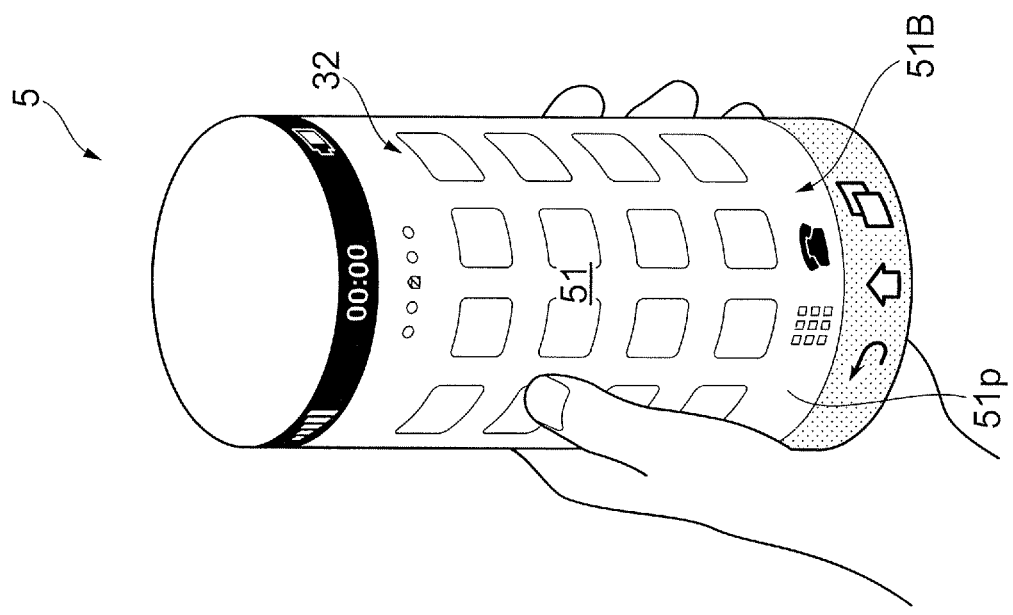

For example, as illustrated in FIGS. 10A and 10B, suppose that the user is holding the terminal device 5 in the double-sided screen state in his or her hand, and is looking at the terminal device 5. In this example, part of the display screen 51 faces the user's face, while part of the display screen 51 faces the user's palm.

In this case, as illustrated in FIG. 10B, the contact surface area is larger for the portion of the display screen 51 that is in contact with the user's palm (hereinafter designated the contact region 51A), while as illustrated in FIG. 10A, the contact surface area is smaller (including zero) for the portion of the display screen 51 that is not in contact with the user's palm (hereinafter designated the non-contact region 51B).

Note that in Exemplary Embodiment 2, the contact region 51A is subject to a condition that contact surface area equal to or greater than a fixed surface area exists. This fixed surface area is greater than the contact surface area of the user's finger, for example, and is taken to be the contact surface area when the user's palm is touching. Consequently, in the operating face configuration process, the accuracy of determining that the user's palm is contacting the display screen 51 may be increased.

Additionally, in Exemplary Embodiment 2, as illustrated in FIG. 10B, the part of the display screen 51 constituting the contact region 51A is configured as the non-operating face 51n that does not accept touch panel operations. Note that the non-operating face 51n forms a band spanning from one end to the other end in the cylindrical axis direction of the terminal device 5. Meanwhile, as illustrated in FIG. 10A, the part of the display screen 51 constituting the non-contact region 51B is configured as the operating face 51p that accepts touch panel operations. Note that the operating face 51p forms a band spanning from one end to the other end in the cylindrical axis direction of the terminal device 5. By configuring the operating face 51p and the non-operating face 51n as above, the operating face 51p is configured to face the user's face.

Furthermore, in the operating face configuration process, the home screen image 32 is displayed in the non-contact region 51B configured as the operating face 51p. In the case of this example, the contact region 51A is configured not to accept touch operations. For this reason, in the terminal device 5 of Exemplary Embodiment 2, the home screen image 32 is prioritized for display in the non-contact region 51B configured as the operating face 51p.

Also, in the operating face configuration process, when displaying a document image or the like on the display screen 51, the document image is displayed using the edge of the operating face 51p as a reference. For example, when displaying a document written in horizontal writing as the document image, the beginning portion of the document is aligned with the edge of the operating face 51p. Furthermore, in the operating face configuration process, the app menu image 34 in the closed state (see FIGS. 4B and 4C) is displayed aligned with the edge of the operating face 51p.

As above, in the terminal device 5 of Exemplary Embodiment 2, a display relevant to the user (such as the display of the home screen image 32 or the display of the beginning portion of a document image, for example) is displayed in front of the user's face, in accordance with how the user is holding the terminal device 5 in hand.

In addition, in the operating face configuration process of Exemplary Embodiment 2, an image is not displayed on the non-operating face 51n. For example, in the case of adopting a self-luminous display such as an organic EL display like in Exemplary Embodiment 2, power consumption is reduced by not displaying an image on the non-operating face 51n.

Note that in Exemplary Embodiment 2, the configuration of the operating face 51p and the non-operating face 51n by the operating face configuration process is cancelled when an operation of cancelling the operating face configuration is performed by the user, or when there is no contact on the display screen 51 for a certain amount of time.

Next, a screen display when the operating face configuration process is being executed will be described. Hereinafter, [1] scroll operation, [2] fingertip rotation operation, and [3] shake operation will be described. A scroll operation is an operation in which the user holds the terminal device 5 with one hand, and slides a finger of the other hand on the operating face 51p. A fingertip rotation operation is an operation in which the user moves his or her fingertips to physically rotate the terminal device 5. In a fingertip rotation operation, the contact position of the user's hand on the display screen 51 changes, while at the same time, the facing region of the display screen 51 that faces the user's face also changes. In other words, a fingertip rotation operation causes the position of the contact region 51A on the display screen 51 to change. A shake operation is an operation in which the user rapidly rotates the terminal device 5 while holding the terminal device 5 in hand. In other words, a shake operation is an operation in which the terminal device 5 moves, but the contact position of the user's hand on the display screen 51 does not change.

[1] Scroll operation

Figure 11A:
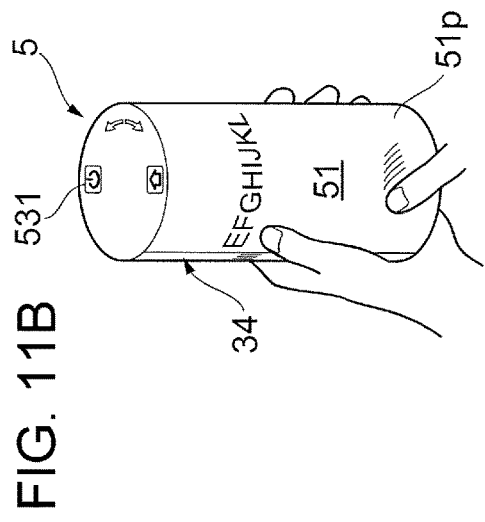
FIGS. 11A to 11D are explanatory diagrams of a scroll operation on a terminal device according to Exemplary Embodiment 2.
Figure 11B:
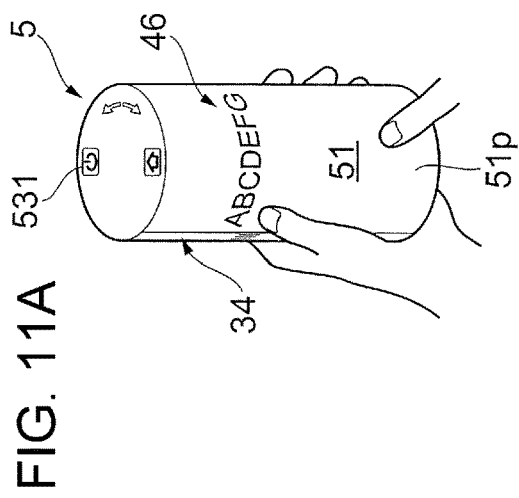
Figure 11C:
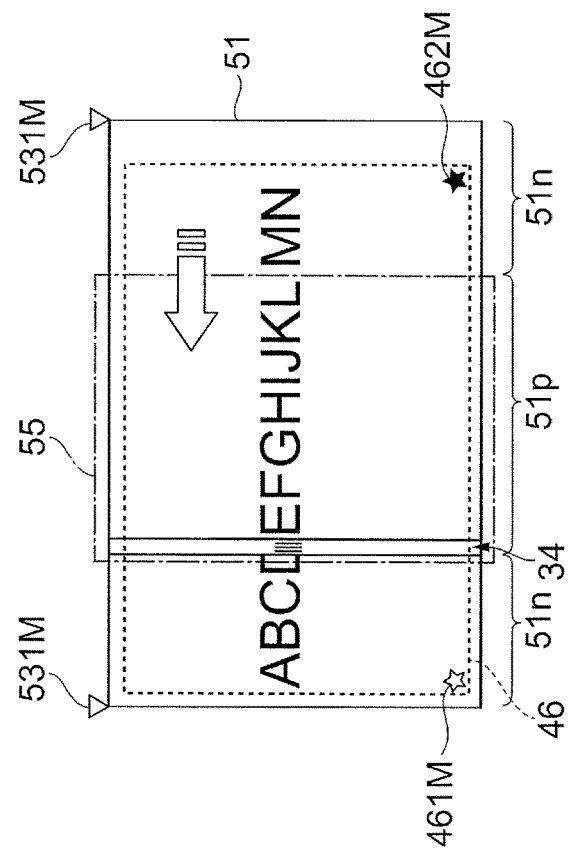
Figure 11D:
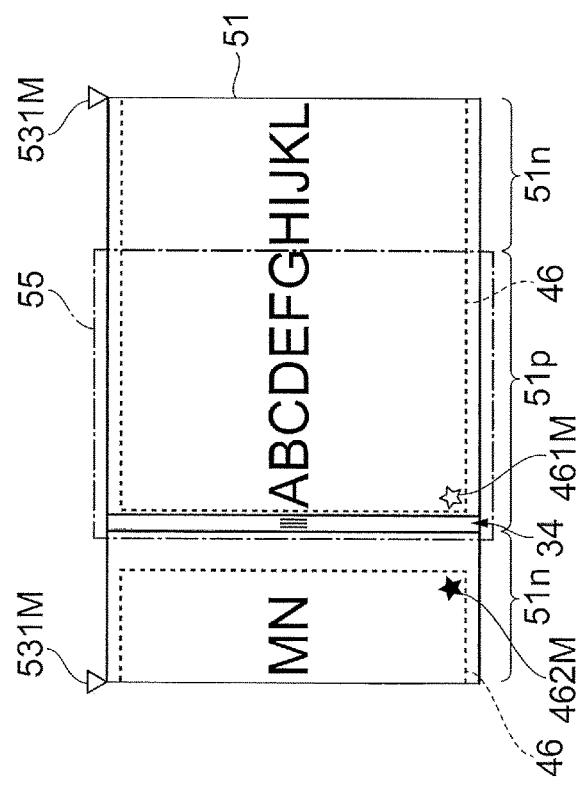

FIGS. 11A to 11D are explanatory diagrams of a scroll operation on the terminal device 5 according to Exemplary Embodiment 2. Note that FIGS. 11A and 11B are perspective views of the terminal device 5 in a state in which the operating face configuration process is being executed, and a display image 46 which is a document image is being displayed as an example on the display screen 51. Meanwhile, FIGS. 11C and 11D are conceptual diagrams for explaining the relationships among the display screen 51, the operating face 51p, the non-operating face 51n, and the display image 46. Additionally, FIGS. 11A and 11C correspond with each other, and FIGS. 11B and 11D correspond with each other.

Note that, for the sake of convenience, the facing region 55 that corresponds to the user's face is indicated by the chain line. Also, in FIGS. 11C and 11D, a triangle mark 531M is displayed at the position corresponding to the power button 531 in FIGS. 11A and 11B. Furthermore, a white star mark 461M is displayed at the beginning of the display image 46, while a black star mark 462 is displayed at the end of the display image 46.

As illustrated in FIG. 11A, the terminal device 5 is being held in the user's hand. Additionally, the operating face 51p and the non-operating face 51n have been set on the display screen 51 by the operating face configuration process discussed earlier. Also, the display image 46 and the app menu image 34 are displayed on the display screen 51.

More specifically, as illustrated in FIG. 11C, the first half of the display image 46 and the app menu image 34 are displayed on the operating face 51p. Consequently, the first half of the display image 46 and the app menu image 34 are displayed on the display screen 51 so as to face the user's face. Meanwhile, the second half of the display image 46 is displayed on the non-operating face 51n.

Subsequently, as illustrated in FIG. 11B, the user uses his or her finger or the like to perform a scroll operation on the display image 46 displayed on the operating face 51p. Subsequently, the display position of the display image 46 on the display screen 51 changes due to the scroll operation.

More specifically, as illustrated in FIG. 11D, the second half of the display image 46 that was being displayed on the non-operating face 51n is displayed on the operating face 51p. Consequently, the second half of the display image 46 is displayed on the display screen 51 in the facing region 55 that faces the user's face. Meanwhile, the first half of the display image 46 becomes displayed on the non-operating face 51n. Note that the app menu image 34 continues to be displayed at the edge of the operating face 51p, irrespectively of the scroll operation.

By performing a scroll operation as above, the display state of the display image 46 on the operating face 51p that acts as the facing region 55 that faces the user's face is changed.

[2] Fingertip rotation operation

Figure 12A:
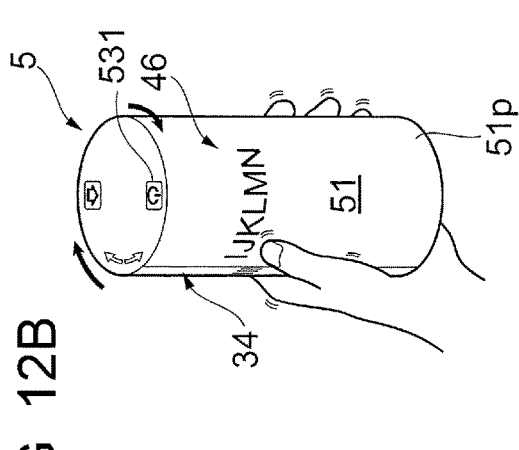
FIGS. 12A to 12D are explanatory diagrams of a fingertip rotation operation on a terminal device according to Exemplary Embodiment 2.
Figure 12B:
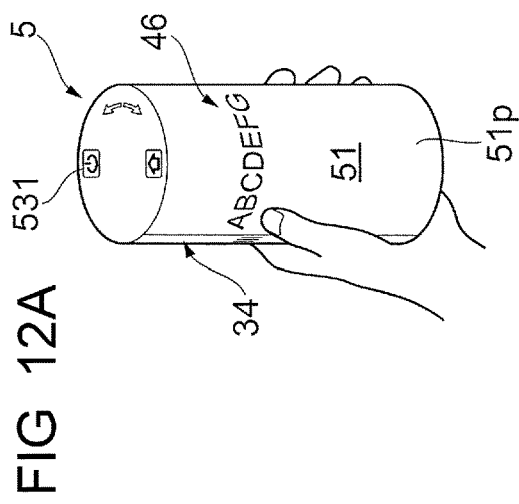
Figure 12C:
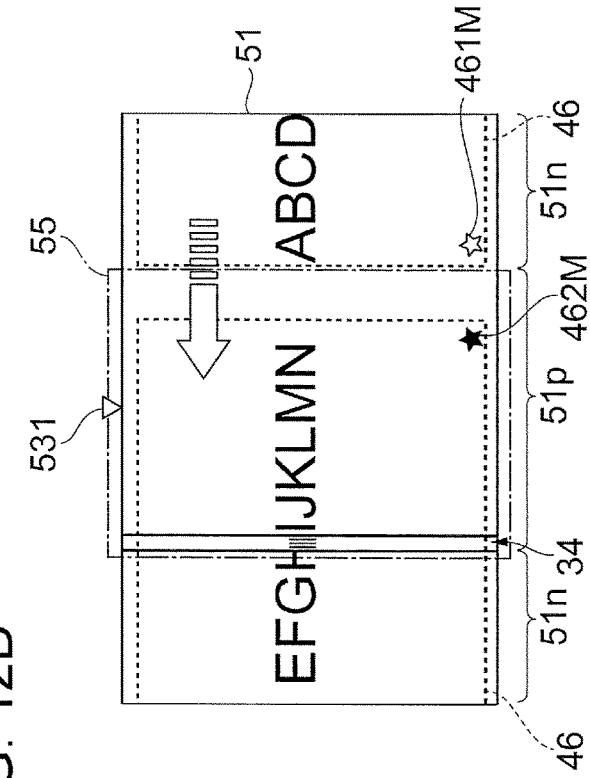
Figure 12D:
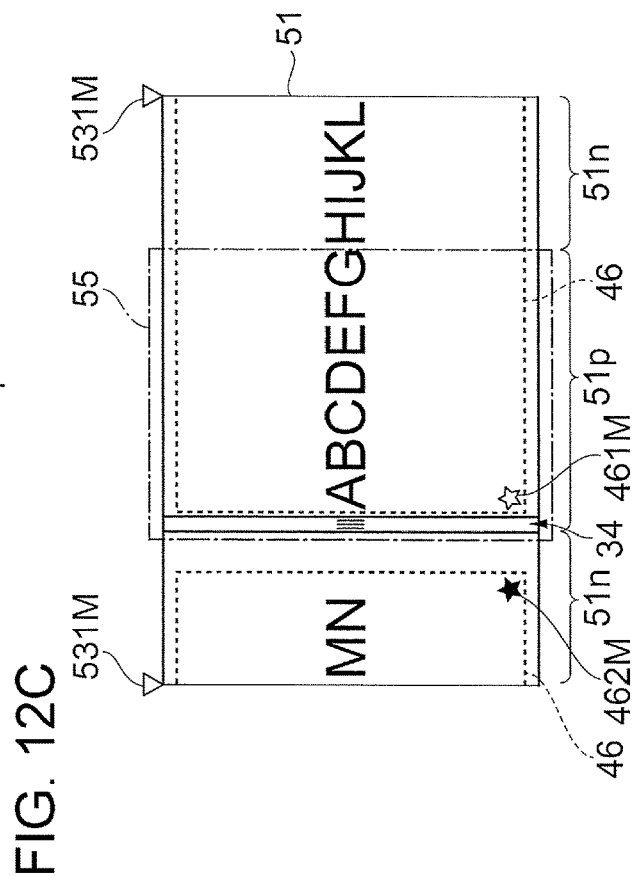

FIGS. 12A to 12D are explanatory diagrams of a fingertip rotation operation on the terminal device 5 according to Exemplary Embodiment 2. Note that FIGS. 12A and 12B are perspective views of the terminal device 5 in a state in which the operating face configuration process is being executed, and a display image 46 which is a document image is being displayed on the display screen 51. Meanwhile, FIGS. 12C and 12D are conceptual diagrams for explaining the relationships among the display screen 51, the operating face 51p, the non-operating face 51n, and the display image 46. Additionally, FIGS. 12A and 12C correspond with each other, and FIGS. 12B and 12D correspond with each other.

As illustrated in FIG. 12A, the terminal device 5 is being held in the user's hand. Additionally, the operating face 51p and the non-operating face 51n have been set on the display screen 51 by the operating face configuration process discussed earlier. Also, the display image 46 and the app menu image 34 are displayed on the display screen 51.

More specifically, as illustrated in FIG. 12C, the first half of the display image 46 and the app menu image 34 are displayed on the operating face 51p. Consequently, the first half of the display image 46 and the app menu image 34 are displayed on the display screen 51 in the facing region 55 so as to face the user's face. Meanwhile, the second half of the display image 46 is displayed on the non-operating face 51n.

Subsequently, as illustrated in FIG. 12B, the user uses his or her fingers or the like to perform a fingertip rotation operation that rotates the terminal device 5 in a rolling manner. In the fingertip rotation operation, the relative positional relationship of the display image 46 with respect to the display screen 51 (terminal device 5) is fixed. Consequently, by rotating the terminal device 5, the portion of the display image 46 displayed in the facing region 55 that faces the user's face changes in accordance with the amount of rotation.

More specifically, as illustrated in FIG. 12D, the second half of the display image 46 that was being displayed on the power button 531 side before the rotation moves to a position that faces the user's face. Also, since the contact location of the user's hand on the display screen 51 changes, the positions of the operating face 51p and the non-operating face 51n on the display screen 51 also change. In this example, the non-operating face 51n is configured on the power button 531 before the rotation, but the operating face 51p becomes configured on the power button 531 side after the rotation. Note that the app menu image 34 is displayed at the edge of the changed operating face 51p to go along with the change in the configured position of the operating face 51p on the display screen 51.

In addition, the terminal device 5 of Exemplary Embodiment 2 is configured not to accept user touch operations on the operating face 51p while the fingertip rotation operation is being performed. As discussed above, the app menu image 34 is displayed at the edge of the operating face 51p. With the fingertip rotation operation, the user's fingers tend to brush the edge of the operating face 51p. For this reason, there is a risk of accidental operation unintended by the user, such as the app menu image 34 being expanded, or a menu item being selected. Accordingly, when the fingertip rotation operation is performed, the terminal device 5 of Exemplary Embodiment 2 is configured not to accept touch operations on the operating face 51p temporarily.

By performing a fingertip rotation operation as above, the relative display position of the display image 46 on the display screen 51 remains fixed, while the position of the display screen 51 that faces the user's face is changed. Additionally, by performing a fingertip rotation operation, the configured positions of the operating face 51p and the non-operating face 51n on the display screen 51 are changed.

[3] Shake operation

Figure 13A:
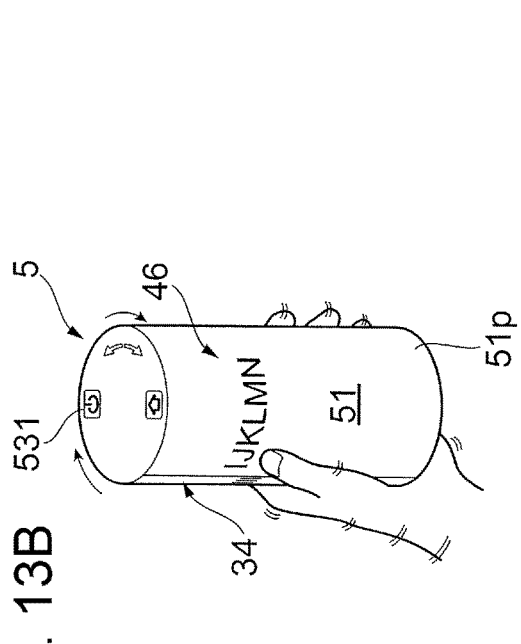
FIGS. 13A to 13D are explanatory diagrams of a shake operation on a terminal device according to Exemplary Embodiment 2.
Figure 13B:
Figure 13C:
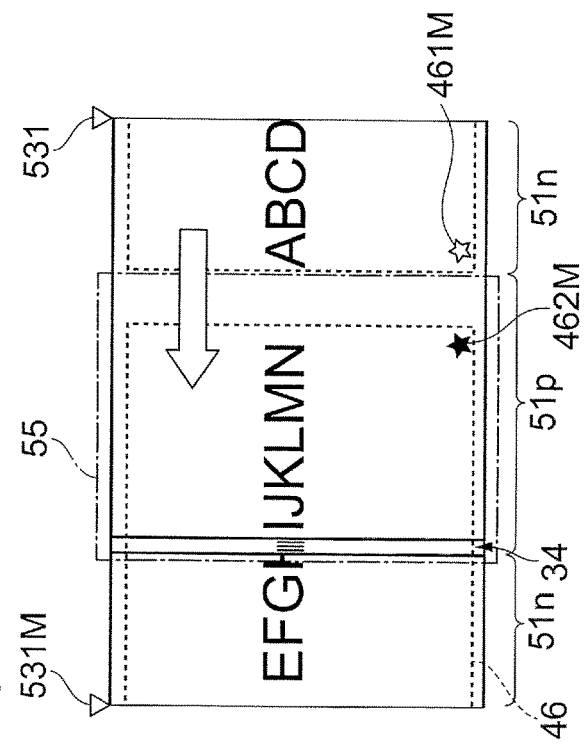
Figure 13D:
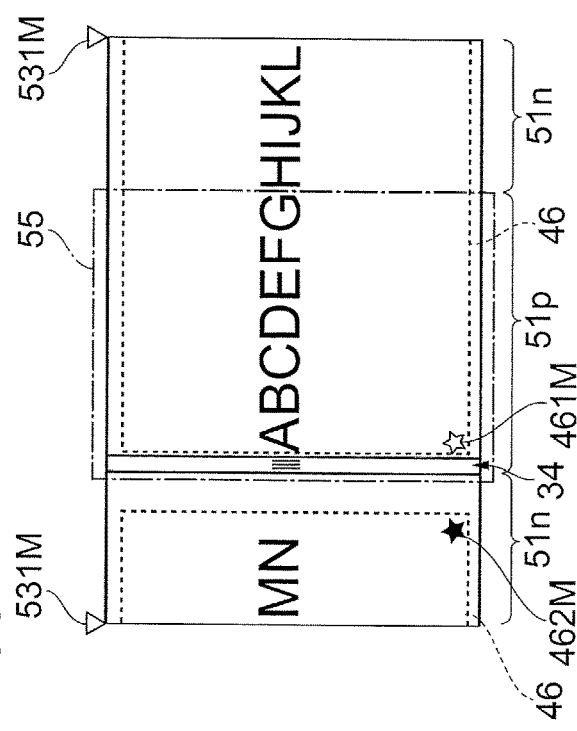

FIGS. 13A to 13D are explanatory diagrams of a shake operation on the terminal device 5 according to Exemplary Embodiment 2. Note that FIGS. 13A and 13B are perspective views of the terminal device 5 in a state in which the operating face configuration process is being executed, and a display image 46 which is a document image is being displayed on the display screen 51. Meanwhile, FIGS. 13C and 13D are conceptual diagrams for explaining the relationships among the display screen 51, the operating face 51p, the non-operating face 51n, and the display image 46. Additionally, FIGS. 13A and 13C correspond with each other, and FIGS. 13B and 13D correspond with each other.

As illustrated in FIG. 13A, the terminal device 5 is being held in the user's hand. Additionally, the operating face 51p and the non-operating face 51n have been set on the display screen 51 by the operating face configuration process discussed earlier. Also, the display image 46 and the app menu image 34 are displayed on the display screen 51.

More specifically, as illustrated in FIG. 13C, the first half of the display image 46 and the app menu image 34 are displayed on the operating face 51p. Consequently, the first half of the display image 46 and the app menu image 34 are displayed on the display screen 51 so as to face the user's face. Meanwhile, the second half of the display image 46 is displayed on the non-operating face 51n.

Subsequently, as illustrated in FIG. 13B, the user performs a shake operation of rotating the terminal device 5 in the circumferential direction while gripping the terminal device 5. Note that the shake operation may also be an operation subject to a condition that motion of a predetermined speed or greater in the rotational direction is sensed by the gyro sensor 107. Due to the shake operation, the display image 46 moves on the display screen 51 in the same direction as the rotation direction. In other words, the relative display position of the display image 46 with respect to the display screen 51 changes.

More specifically, the second half of the display image 46 that was being displayed on the non-operating face 51n is displayed on the operating face 51p. Consequently, the second half of the display image 46 is displayed on the display screen 51 so as to face the user's face. Note that the app menu image 34 continues to be displayed at the edge of the operating face 51p, irrespectively of the scroll operation. Meanwhile, the first half of the display image 46 becomes displayed on the non-operating face 51n.

By performing a shake operation as above, the display state of the display image 46 on the operating face 51p that acts as the part facing the user's face is changed.

Figure 14:
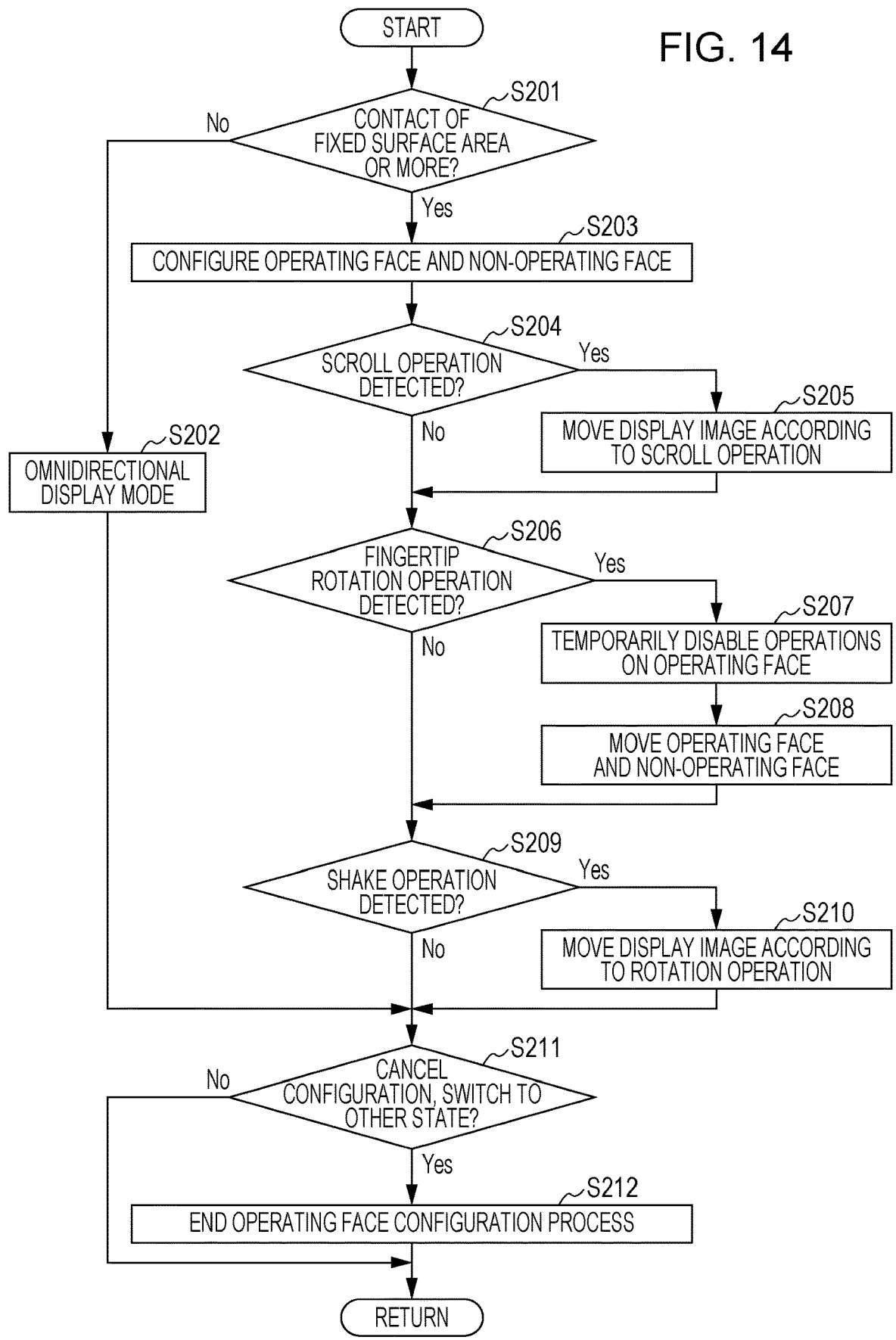
FIG. 14 is an operational flowchart of an operation screen configuration process according to Exemplary Embodiment 2.

Next, the operating face configuration process executed by the controller 54 of the terminal device 5 according to Exemplary Embodiment 2 will be described. FIG. 14 is an operational flowchart of an operation screen configuration process according to Exemplary Embodiment 2.

In the terminal device 5, it is determined whether or not contact of a fixed surface area or greater exists on the display screen 51 (S201). In S201, if contact of a fixed surface area or greater does not exist (S201, No), an omnidirectional display that displays an image over the entire display screen 51 is conducted (S202). With the omnidirectional display, user touch operations are accepted over the entire display screen 51.

Meanwhile, in S201, if there is contact of the fixed surface area or greater (S201, Yes), the contact region 51A of the display screen 51 is configured as the non-operating face 51n, while the non-contact region 51B is configured as the operating face 51p (S203). After that, detection of a scroll operation on the operating face 51p is conducted (S204). If a scroll operation on the operating face 51p is detected (S204, Yes), the display image is moved over the display screen 51 in accordance with the scroll operation (S205).

Meanwhile, if a scroll operation on the operating face 51p is not detected (S204, No), or after the image is moved in accordance with a scroll operation in S205, it is determined whether or not a fingertip rotation operation is detected (S206). In S206, if a fingertip rotation operation is detected (S206, Yes), the operating face 51p is configured not to accept touch operations temporarily (S207). Furthermore, by reconfiguring the operating face 51p and the non-operating face 51n, the operating face 51p and the non-operating face 51n move relative to the display screen 51 (S208). Additionally, due to the movement of the operating face 51p on the display screen 51, the display image displayed on the display screen 51 moves.

Subsequently, if a fingertip rotation operation is not detected (S206, No), or after the operating face 51p and the non-operating face 51n are moved in S208, it is determined whether or not a shake operation on the terminal device 5 is detected (S209). If a shake operation on the terminal device 5 is detected (S209, Yes), the image displayed on the display screen 51 is moved in accordance with the rotational direction of the rotation operation with respect to the terminal device 5 (S210). Meanwhile, if a shake operation on the terminal device 5 is not detected, it is determined if a configuration cancelling the operating face configuration has been performed, or if contact of a fixed surface area or greater has not been performed for a certain amount of time or more (S211). In S211, if the cancellation of the operating face configuration is not performed or if the time has not elapsed (S211, No), the flow returns to S201. Meanwhile, in S211, if the cancellation of the operating face configuration is performed or if the certain amount of time has elapsed (S211, Yes), the operating face configuration process ends (S212).

Note that Exemplary Embodiment 2 is similar to Exemplary Embodiment 1 in the case of camera recording. In other words, in the terminal device 5 of Exemplary Embodiment 2, when an image of a photographic subject is being displayed on the operating face 51p, operating buttons related to camera recording may be displayed on the non-operating face 51n, and touch operations on the non-operating face 51n may be enabled temporarily.

Note that in the operating face configuration process of Exemplary Embodiment 2, an image may be displayed on the non-operating face 51n even while the non-operating face 51n is configured not to accept touch operations. Conversely, in the operating face configuration process of Exemplary Embodiment 2, the power controller 66 may also turn off power to the part of the display screen 51 corresponding to the non-operating face 51n.

In Exemplary Embodiment 2, the operating face 51p and the non-operating face 51n are decided in accordance with the contact surface area on the display screen 51, and in addition, the home screen image 32 is displayed on the operating face 51p and the like, but the configuration is not limited thereto. For example, a sectional region 51S (see FIG. 8B) on the display screen 51 having a large number of touch operations by the user and a partial region 51S having a small number of touch operations may be detected for a fixed amount of time. In other words, for each sectional region 51S, the frequency of user touch operations is detected. Consequently, the operating face 51p may be configured on the display screen 51 on the basis of sectional regions 51S having a large number of touch operations by user, whereas the non-operating face 51n may be configured on the display screen 51 on the basis of sectional regions 51S having a small number of touch operations.

Note that although Exemplary Embodiment 1 is described using an example of a terminal device 1 in which the display screens 11 respectively face to the front and rear as a result of the terminal device 1 being folded, the content of the present exemplary embodiment may also be applied to a terminal device having two screens that respectively face to the front and rear in advance, without being folded. In addition, although Exemplary Embodiment 2 is described using an example of a terminal device 5 having a cylindrical shape, the device is not limited to a cylindrical shape, and the content of the present exemplary embodiment may also be applied to a terminal device having a multidirectional image display face, such as one with an elliptical shape or a polygonal shape.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal device, comprising:
at least one hardware processor configured to implement:
controlling a multidirectional image display face;
executing a predetermined process in accordance with a user contact operation with respect to the image display face;
specifying a position of a user using the device; and
on a basis of information about the position, configuring an operating face that accepts the contact operation in a facing region that faces the user's face on part of the image display face,
wherein the facing region is specified by determining a lesser amount of contact from the user onto the facing region than onto at least one other region of the image display face,
wherein the at least one hardware processor is further configured to:
compare amounts of contact from the user onto ones of the facing region and the at least one other region and to determine which of the amounts of contact is the lesser amount,
specify a facing-away region by determining a greater amount of contact from the user onto the facing-away region than onto the facing region, and, in response thereto, configure a second operating face, of the facing-away region and facing away from the operating face, to not accept further contact operations in the facing-away region while the user contacts the facing-away region,
wherein the multidirectional image display face comprises a 360° display,
wherein the greater amount of the contact from the user grips the facing-away region,
wherein, while the facing-away region is configured to not accept further contact operations, the facing-away region displays portions of a display image extending from the facing region,
wherein the facing region is further configured to accept a user operation to slide the display image around the 360° display such that a portion of the display image on the facing region is slid to the facing-away region and a portion of the display image on the facing-away region is slid to the facing region, and
wherein before, during and after sliding the display, an application menu remains stationary along a length of the 360° display.

2. The terminal device according to claim 1, wherein the at least one hardware processor is further configured to implement:
specifying the position on a basis of sensing the contact by the user with respect to the image display face.

3. The terminal device according to claim 2, wherein the at least one hardware processor is further configured to implement:
configuring a region, of the image display face in which the contact exceeding a predetermined surface area is sensed, as a non-operating face that does not accept the contact operation.

4. The terminal device according to claim 3, wherein the at least one hardware processor is further configured, if a predetermined application is executed on the operating face, to implement presenting a display related to operation of the application on the non-operating face, and temporarily accepting the contact operation on the non-operating face to execute the predetermined process.

5. The terminal device according to claim 1, wherein the at least one hardware processor is further configured, if a motion operation that changes the facing region while also changing a contact position of the user with respect to the image display face is performed, to implement temporarily not executing the predetermined process in accordance with the contact operation with respect to operating face.

6. The terminal device according to claim 1, wherein the at least one hardware processor is further configured to implement:
sensing motion of a display and if the motion of the display is sensed in which a user contact position with respect to the image display face does not change, moving an image being displayed on the image display face.

7. A terminal device, comprising:
at least one hardware processor configured to implement:
controlling a multidirectional image display face;
specifying a position of a user using the device; and
controlling, on a basis of information about the position of the user specified, display of an edge of an image to be displayed on the image display face on the image display face in correspondence with an edge of a facing region that faces the user's face on part of the image display face,
wherein the facing region is specified by determining a lesser amount of contact from the user onto the facing region than onto at least one other region of the image display face,
wherein the at least one hardware processor is further configured to:
compare amounts of contact from the user onto ones of the facing region and the at least one other region and to determine which of the amounts of contact is the lesser amount; and
specify a facing-away region by determining a greater amount of contact from the user onto the facing-away region than onto the facing region, and, in response thereto, configure a second operating face, of the facing-away region and facing away from the operating face, to not accept further contact operations in the facing-away region while the user contacts the facing-away region,
wherein the multidirectional display comprises a 360° display,
wherein the greater amount of the contact is from the user gripping the facing-away region,
wherein, while the facing-away region is configured to not accept further contact operations, the facing-away region displays portions of a display image from the facing region,
wherein the facing region is configured to accept a user operation to slide the display image around the 360° display such that a portion of the display image on the facing region is slid to the facing-away region and a portion of the display image on the facing-away region is slid to the facing region, and
wherein before, during and after sliding the display, an application menu remains stationary along a length of the 360° display.

8. A non-transitory computer readable medium storing a program causing a computer functioning as a terminal device provided with a display that includes a multidirectional image display face to execute a process for displaying an image, the process comprising:
executing a predetermined process in accordance with a user contact operation with respect to the image display face;
specifying a position of a user using the device;
configuring, on a basis of information about the position, an operating face that accepts the contact operation in a facing region that faces the user's face on part of the image display face;
specifying the facing region by determining a lesser amount of contact from the user onto the facing region than onto at least one other region of the image display face; and
comparing amounts of contact from the user onto ones of the facing region and the at least one other region and to determine which of the amounts of contact is the lesser amount; and
specifying a facing-away region by determining a greater amount of contact from the user onto the facing-away region than onto the facing region, and, in response thereto, configuring a second operating face, of the facing-away region and facing away from the operating face, to not accept further contact operations in the facing-away region while the user contacts the facing-away region,
wherein the multidirectional display comprises a 360° display,
wherein the greater amount of the contact is from the user gripping the facing-away region,
wherein, while the facing-away region is configured to not accept further contact operations, the facing-away region displays portions of a display image from the facing region,
wherein the facing region is configured to accept a user operation to slide the display image around the 360° display such that a portion of the display image on the facing region is slid to the facing-away region and a portion of the display image on the facing-away region is slid to the facing region, and
wherein before, during and after sliding the display, an application menu remains stationary along a length of the 360° display.

9. The terminal device according to claim 1, further comprising:
a first camera; and
a second camera,
wherein the at least one hardware processor is further configured to implement:
determining which one of the first camera and the second camera senses a face of the user, and
further setting the facing region to a side of the image display face having the one of the first camera and the second camera that senses the face of the user.

10. The terminal device according to claim 1, wherein the facing region is further configured to accept a user operation to slide the display image from the facing-away region to the facing region.

* * * * *